US011429824B2

(12) United States Patent
Li et al.

(10) Patent No.: US 11,429,824 B2
(45) Date of Patent: Aug. 30, 2022

(54) METHOD AND SYSTEM OF DEEP SUPERVISION OBJECT DETECTION FOR REDUCING RESOURCE USAGE

(71) Applicant: Intel Corporation, Santa Clara, CA (US)

(72) Inventors: Jianguo Li, Beijing (CN); Jiuwei Li, Beijing (CN); Yuxi Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 17/053,706

(22) PCT Filed: Sep. 11, 2018

(86) PCT No.: PCT/CN2018/105107
§ 371 (c)(1),
(2) Date: Nov. 6, 2020

(87) PCT Pub. No.: WO2020/051776
PCT Pub. Date: Mar. 19, 2020

(65) Prior Publication Data
US 2021/0365716 A1    Nov. 25, 2021

(51) Int. Cl.
*G06K 9/62*    (2022.01)
*G06N 3/04*    (2006.01)
*G06V 10/44*    (2022.01)

(52) U.S. Cl.
CPC .......... *G06K 9/629* (2013.01); *G06K 9/6251* (2013.01); *G06K 9/6267* (2013.01); *G06N 3/04* (2013.01); *G06V 10/454* (2022.01)

(58) Field of Classification Search
CPC .... G06K 9/629; G06K 9/6251; G06K 9/6267; G06K 9/6274; G06N 3/04; G06V 10/454; G06V 20/20; G06V 20/56; G06V 20/00; G06V 10/82; H04N 5/232; H04N 5/247
See application file for complete search history.

(56) References Cited

U.S. PATENT DOCUMENTS

| 10,380,753 | B1* | 8/2019 | Csordás | G06N 3/08 |
| 10,628,705 | B2* | 4/2020 | Jiang | G06N 3/084 |
| 10,984,319 | B2* | 4/2021 | Zoph | G06N 3/04 |
| 11,087,201 | B2* | 8/2021 | Hua | G06N 3/04 |
| 11,176,404 | B2* | 11/2021 | Zhao | G06K 9/3233 |
| 2017/0124409 | A1 | 5/2017 | Choi et al. | |
| 2017/0351936 | A1 | 12/2017 | Jiang | |

(Continued)

FOREIGN PATENT DOCUMENTS

| CN | 104809426 | 7/2015 |
| CN | 104992223 | 10/2015 |

(Continued)

OTHER PUBLICATIONS

International Preliminary Report on Patentability for PCT Application No. PCT/CN2018/105107, dated Mar. 25, 2021.

(Continued)

*Primary Examiner* — Xuemei G Chen
(74) *Attorney, Agent, or Firm* — Essential Patents Group, LLP.

(57) ABSTRACT

A system, article, and method of deep supervision object detection for reducing resource usage is provided for image processing and that uses depth-wise dense blocks.

25 Claims, 11 Drawing Sheets

(56) References Cited

U.S. PATENT DOCUMENTS

| | | | | |
|---|---|---|---|---|
| 2018/0173571 | A1* | 6/2018 | Huang | G06N 3/084 |
| 2018/0260957 | A1* | 9/2018 | Yang | G06T 7/143 |
| 2019/0114391 | A1* | 4/2019 | Jaganathan | G16B 40/00 |
| 2019/0122074 | A1* | 4/2019 | Zhang | G16H 50/20 |
| 2019/0130896 | A1* | 5/2019 | Zhou | G10L 15/24 |
| 2019/0147318 | A1* | 5/2019 | Howard | G06N 3/08 706/27 |
| 2019/0188537 | A1* | 6/2019 | Dutta | G06K 9/6262 |
| 2019/0197083 | A1* | 6/2019 | Chen | G06F 17/15 |
| 2019/0208979 | A1* | 7/2019 | Bassa | G05D 1/0274 |
| 2019/0220653 | A1* | 7/2019 | Wang | G06K 9/00268 |
| 2019/0220704 | A1* | 7/2019 | Schulz-Trieglaff | G06N 3/084 |
| 2019/0295688 | A1* | 9/2019 | DePristo | G16B 30/00 |
| 2019/0311223 | A1* | 10/2019 | Wang | G06V 30/2504 |
| 2019/0347537 | A1* | 11/2019 | Howard | G06N 3/0454 |
| 2019/0366153 | A1* | 12/2019 | Zhang | A63B 24/0062 |
| 2019/0377930 | A1* | 12/2019 | Chen | G06V 40/1347 |
| 2020/0005074 | A1* | 1/2020 | Wang | G06K 9/00684 |
| 2020/0005899 | A1* | 1/2020 | Nicula | G16B 20/00 |
| 2020/0012898 | A1* | 1/2020 | Zhao | G06V 10/82 |
| 2020/0019628 | A1* | 1/2020 | Chen | G06K 9/6267 |
| 2020/0320748 | A1* | 10/2020 | Levinshtein | G06K 9/00248 |
| 2020/0336699 | A1* | 10/2020 | Kim | G06T 1/20 |
| 2020/0342240 | A1* | 10/2020 | Szoke-Sieswerda | B25J 9/1697 |
| 2021/0027041 | A1* | 1/2021 | Aragon | G06T 7/90 |
| 2021/0158023 | A1* | 5/2021 | Fu | G06T 7/70 |
| 2021/0200993 | A1* | 7/2021 | Chen | G06K 9/6232 |
| 2021/0201501 | A1* | 7/2021 | Yuan | G06N 3/02 |
| 2021/0225047 | A1* | 7/2021 | Pawar | A61B 5/055 |
| 2021/0248749 | A1* | 8/2021 | Novikov | G16H 30/20 |

FOREIGN PATENT DOCUMENTS

| | | |
|---|---|---|
| CN | 106909778 | 6/2017 |
| CN | 107004138 | 8/2017 |

OTHER PUBLICATIONS

International Search Report and Written Opinion for International Patent Application No. PCT/CN2018/105107, dated Jun. 14, 2019.
Chollet, F. "Xception: Deep learning with depthwise separable convolutions", In CVPR, 2016.
Everingham, M. et al., "The PASCAL visual object classes (voc) challenge", IJCV, 88 (2): 303-338, 2010.
Fu, Cheng Yang et al., "DSSD: Deconvolutional single shot detector", arXiv preprint arXiv:1701.06659, 2017.
Geiger, et al., "Are we ready for Autonomous Driving? The KITTI Vision Benchmark Suite", CVPR 2012.
Girshick, R., "Fast R-CNN", ICCV, 2015.
Girshick, R. et al., "Rich feature hierarchies for accurate object detection and semantic segmentation", CVPR, 2014.
Howard, Andrew G. et al., "MobileNets: Efficient Convolutional Neural Networks for Mobile Vision Applications", https://arxiv.org/abs/1704.04861, Apr. 17, 2017.
Huang, et al., "Densely Connected Convolutional Networks", IEEE Conference on Computer Vision and Pattern Recognition (CVPR); 2017, 9 pages.
Huang, J. et al., "Speed/accuracy trade-offs for modern convolutional object detectors", In CVPR, 2017.
Iandola, et al., "SqueezeNet AlexNet-level accuracy with 50x fewer parameters and <1MB model size", arXiv.org > cs > arXiv:1602.07360; pp. 1-5; 2016.
Li, X. et al., "Pelee: A real-time object detection system on mobile devices", In ICLR Workshop, 2018.
Li, Y. et al., "R-FCN: Object detection via region-based fully convolutional networks", In NIPS, 2016.
Lin, T.Y. et al., "Feature pyramid networks for object detection", CVPR: 2017.
Lin, T.Y. et al., "Microsoft COCO: Common Objects in Context", ECCV (2017).
Liu, W. et al., "SSD: Single shot multibox detector", ECCV, 2016.
Redmon, J. et al., "YOLO9000: Better, faster, stronger", CVPR, 2017.
Redmon, J. et al., "You only look once: Unified, real-time object detection", CVPR, 2016.
Ren, S. et al., "Faster r-cnn: Towards realtime object detection with region proposal networks", NIPS, 2015.
Sandler, M. et al., "Mobilenetv2: Inverted residuals and linear bottlenecks", CVPR (2018).
Shen, Z. et al., "DSOD: Learning Deeply Supervised Object Detectors from Scratch", IEEE International Conference on Computer Vision (ICCV) 2017, DOI:10.1109/ICCV.2017.212.
Wu, et al., "SqueezeDet: Unified, Small, Low Power Fully Convolutional Neural Networks for Real-Time Object Detection for Autonomous Drive", CVPRW 2017.

* cited by examiner

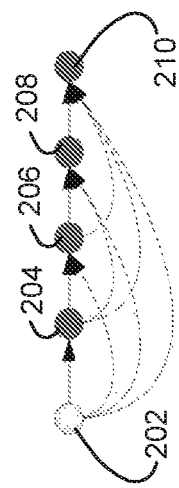
FIG. 2
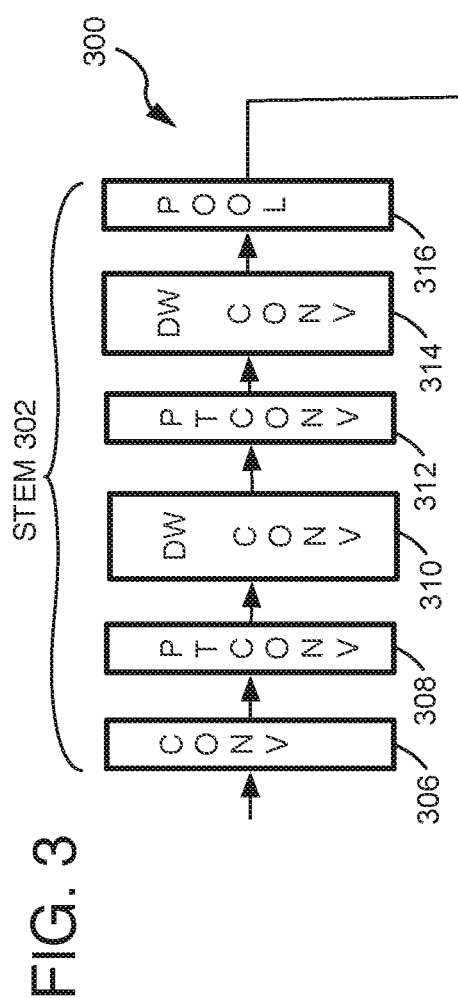
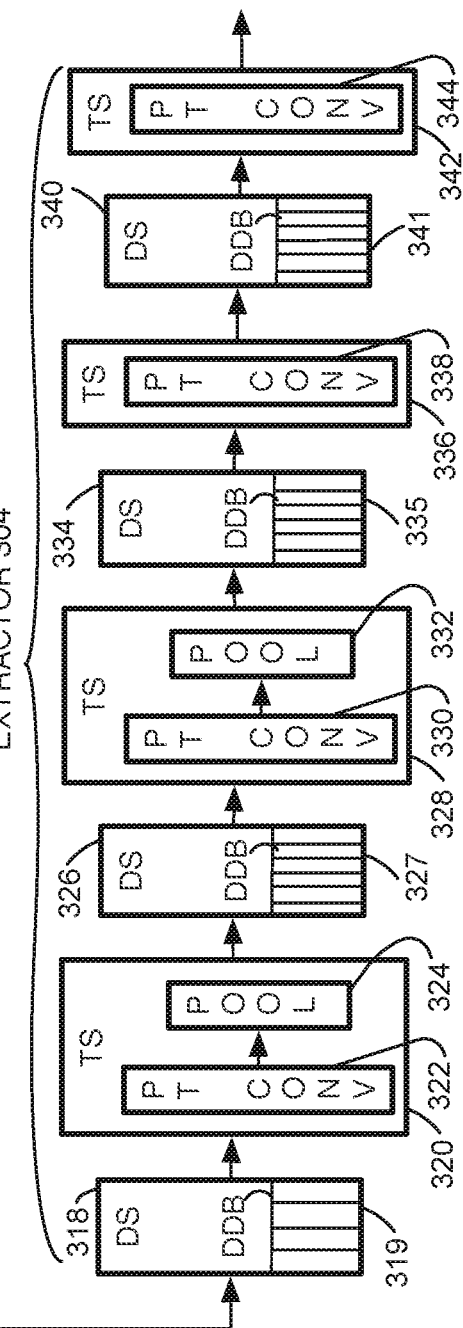
FIG. 3

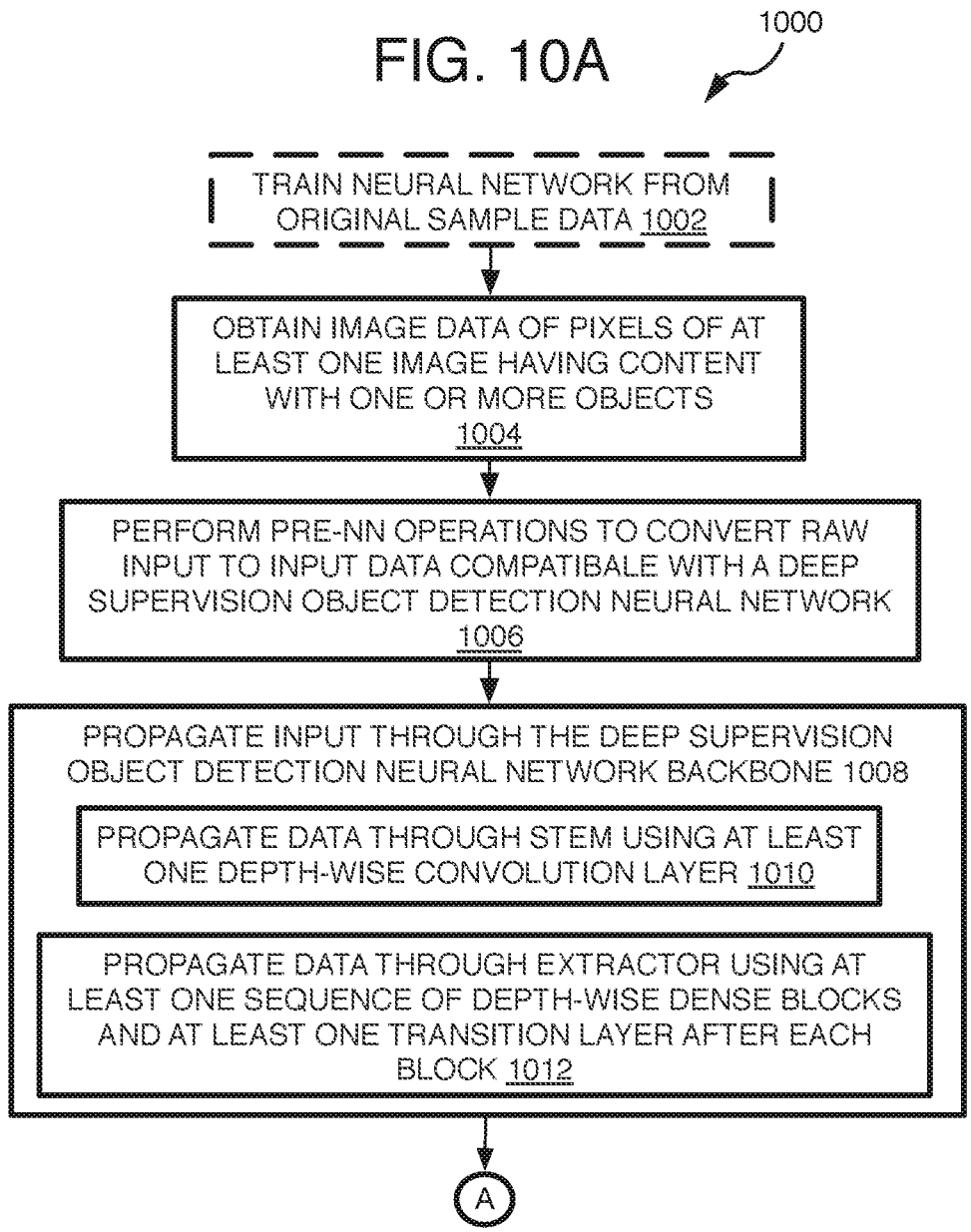

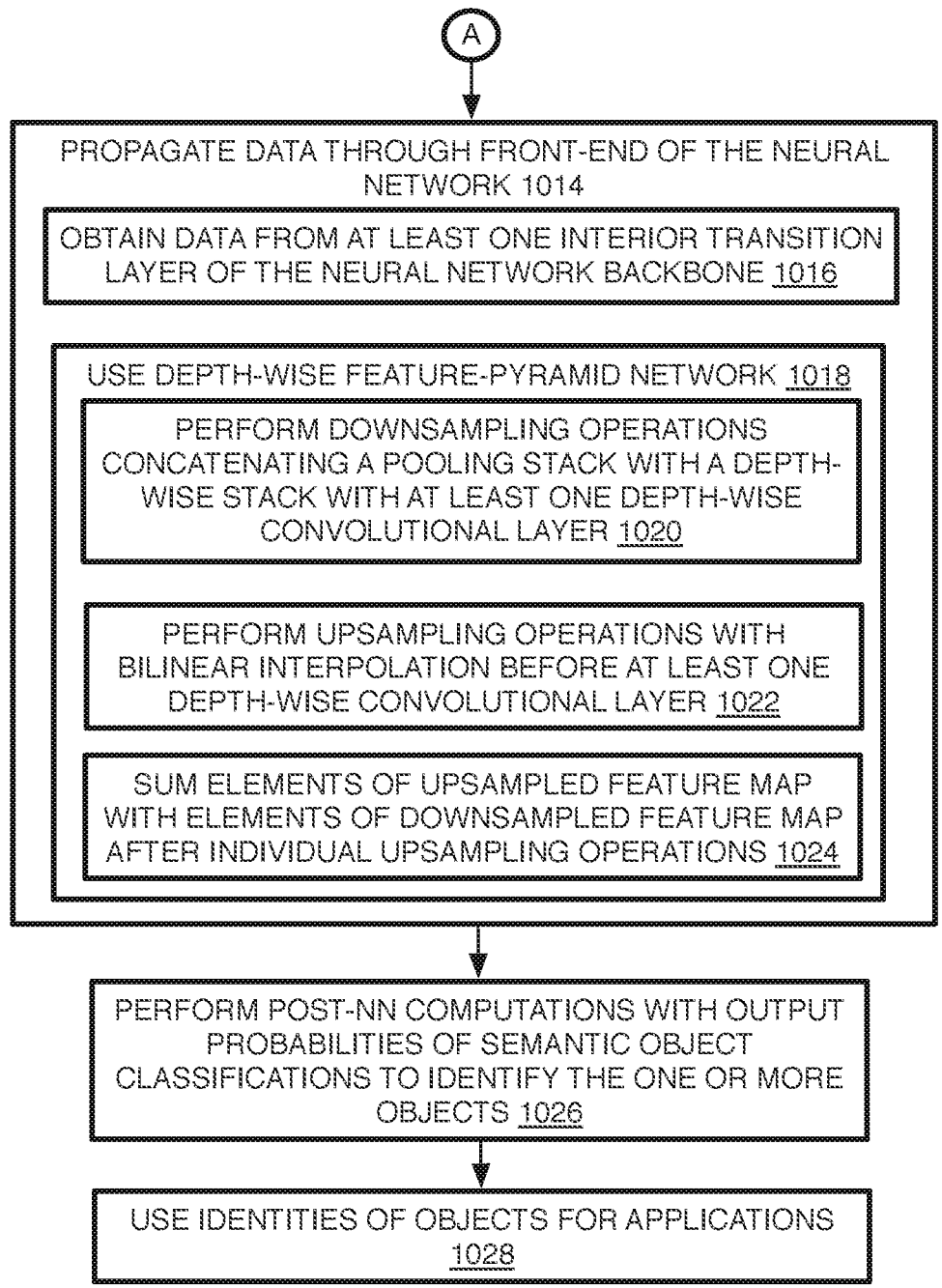

METHOD AND SYSTEM OF DEEP SUPERVISION OBJECT DETECTION FOR REDUCING RESOURCE USAGE

CLAIM OF PRIORITY

This Application is a National Stage Entry of, and claims priority to, PCT Application No. PCT/CN2018/105107, filed on 11 Sep. 2018 and titled "METHOD AND SYSTEM OF DEEP SUPERVISION OBJECT DETECTION FOR REDUCING RESOURCE USAGE", which is incorporated by reference in its entirety for all purposes.

BACKGROUND

Many computer and electronic devices perform object detection in order to determine the semantic label of one or more objects in an image. This may be performed with 2D data such as with RGB color domain pixel data or could be based on 3D data, such as with depth maps for computer-vision or other 3D modeling applications. Otherwise, object detection also is often desired in other light spectrum domains such as for medical images and/or multi-spectrum images, and so forth.

In order to achieve high accuracy with such object detection, many object detection systems employ deep neural networks (DNNs) which can reach very large sizes with 100+ layers and thousands of nodes on each layer. Thus, the DNN systems are often too computationally heavy for always-on electronic devices or small devices with limited resources such as a mobile smart phone or smart speaker for example. This results in a DNN object detection system that consumes too much power on such devices or alternatively sacrifices speed and/or accuracy by using reduced size neural networks with relatively limited vocabularies.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a schematic flow diagram to demonstrate dense blocks for a neural network;

FIG. 3 is a schematic flow diagram showing a deep supervision object detection neural network according to at least one of the implementations herein;

FIGS. 10A-10B is a detailed flow chart of a method of deep supervision object detection in accordance with the implementations herein;

DETAILED DESCRIPTION

Figure 1:
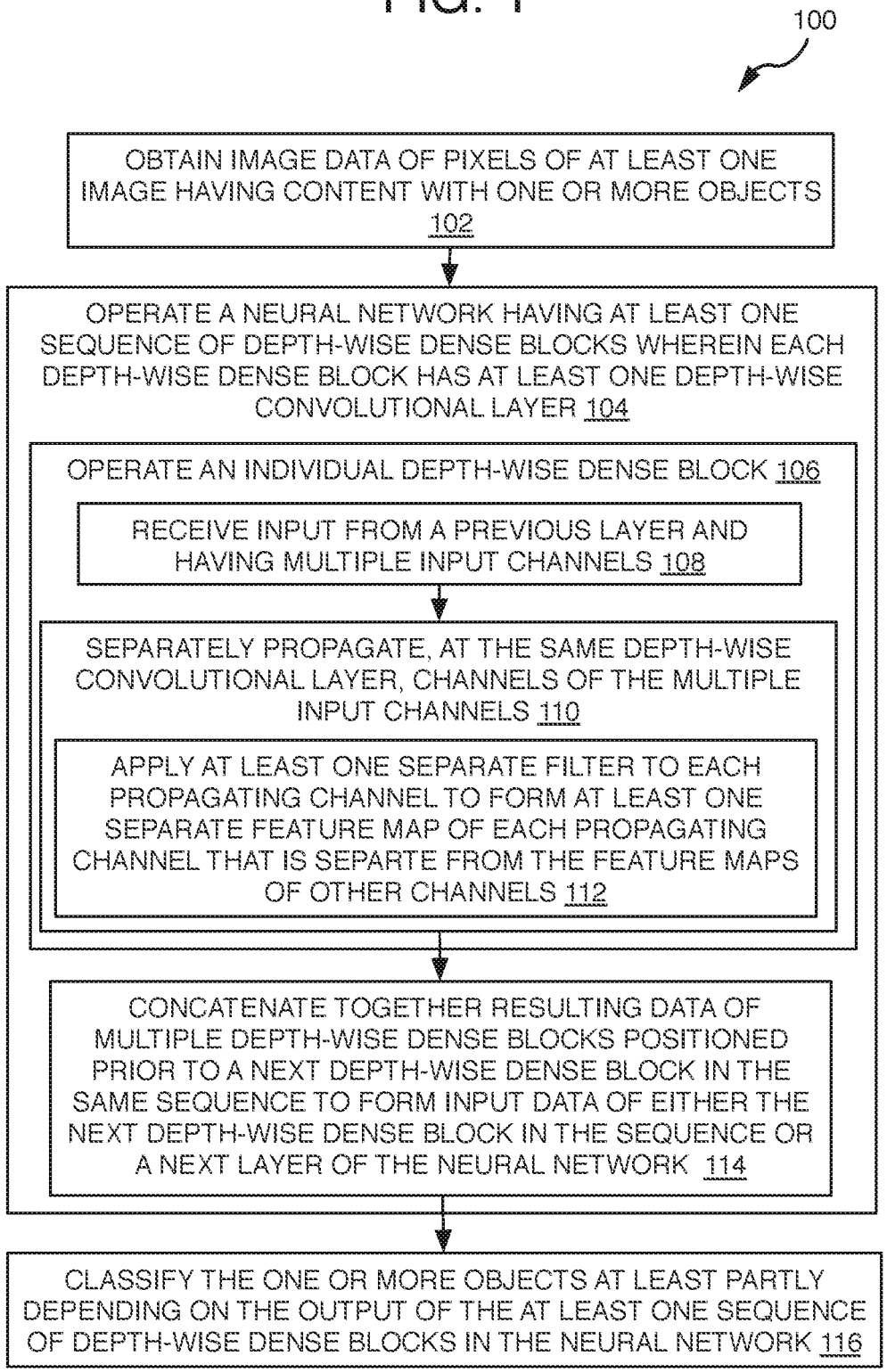
FIG. 1 is a flow chart of a method of object detection for image processing according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, any of which may have light projectors and/or sensors for performing object detection, depth measurement, and other tasks, and may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of deep supervision object detection for reducing resource usage.

As mentioned, low resource devices such as battery-operated computing devices that perform object detection on captured or stored images often do not have the capacity to operate high quality neural network object detection at speeds acceptable to a user. Most conventional object detection DNNs use various convolutional neural network (CNN) based object detection frameworks. This includes two-stage based methods that first generates proposed regions of interest (RoIs or bounding boxes) around each object in an image and then runs the image data of the regions in the neural networks. Such two-stage object detection systems include regional-CNN (R-CNN) (see Girshick, R. et al., "Rich Feature Hierarchies for Accurate Object Detection and Semantic Segmentation", Conference on Computer Vision and Pattern Recognition (CVPR) (2014)); Fast-R-CNN (see Girshick, R., "Fast R-CNN", International Conference on Computer Vision (ICCV), (2015)); Faster R-CNN (see Ren, S., et al., "Faster R-CNN: Towards real-time object detection with region proposal networks", Neural Information Processing Systems Proceedings (NIPS) (2015)); and R-FCN (see Li, Y., et al., "R-FCN: Object detection via region-based Fully Convolutional Networks", NIPS (2016)). Otherwise, one-stage based methods that omit the region proposals include YOLO (see Redmon, J. et al., "You Only Look Once: Unified, real-time object detection", CVPR (2016)); Single Shot Multi-box Detector (SSD) (see Liu, W. et al., "SSD: Single shot multibox detector", European Conference on Computer Vision (ECCV) (2016)), and so forth. The single-stage based methods are relatively faster than two-stage based methods, but with somewhat relatively lower accuracy. All of these more accurate methods, however, have computing costs (or in other words, computational loads) that are much too large for devices with limited power, memory, and processing resources.

To attempt to avoid these problems, lightweight (efficient and small-size) object detection neural networks have been developed for resource-restricted usages. Such networks include SqueezeDet (see Wu, B. et al., "SqueezeDet: Unified, small, low power fully convolutional neural networks for real-time object detection for autonomous driving", CVPR Workshops (2017)). SqueezeDet introduces an efficient SqueezeNet-based backbone into a single-stage framework for efficient detection, and which achieves comparable results on Pattern Analysis, Statistical Modeling and Computational Learning standard for Visual Object Classes (PASCAL VOC) 2007 (see Everingham, M., et al., "The PASCAL visual object classes (VOC) challenge", IJCV, 88(2):303-338 (2010)) and Karlsruhe Institute of Technology and Toyota Technological Institute Chicago (KITTI) standards for vision benchmarks (see Geiger, A., et al., "Are we ready for autonomous driving? the KITTI vision benchmark suite", CVPR (2012)). For SqueezeNet, see Iandola, F. N. et al., "SqueezeNet: Alexnet-level accuracy with 50× fewer parameters and <0.5 mb model size", International Conference on Learning Representations (ICLR) Committee (2016).

Other attempts to reduce the computational load of an object detection neural network include depth-wise convolution that has shown great parameter and computing efficiency in generic image classification tasks (see Chollet, F., "Xception: Deep learning with depth-wise separable convolutions", CVPR (2016)). Such depth-wise convolution also was introduced into the SSD framework for object detection purpose as a backbone and named as MobileNet-SSD (see Sandler, M. et al., "Inverted residuals and linear bottlenecks: Mobile networks for classification, detection and segmentation", arXiv preprint arXiv:1801.04381, CVPR (2018)). Another technique is Pelee which utilizes a two-way densely connected structure to reduce computation consumption while keeping detection accuracy for mobile applications (see Li, X. et al., "Pelee: A real-time object detection system on mobile devices", ICLR Workshop (2018)). Yet another technique is Tiny YOLO which further improves processing speed of YOLO by compressing the backbone networks with some accuracy drops (see Redmon cited above).

Despite these efforts, a large accuracy gap still exists between efficient yet tiny networks (SqueezeDet, MobileNet-SSD, Pelee, Tiny-YOLO, etc.) and those of full-sized counterparts. For instance, SqueezeNet-SSD and MobileNet-SSD achieve 64.3% and 68.0% mean Average Precision (mAP) accuracy on PASCAL VOC 2007 respectively, while full-sized SSD reaches 77.2% mAP under the same parameters. Thus, these techniques still do not achieve a desired trade-off between accuracy and resources such as power consumption, processing speed, and/or required memory capacity. The computational load of a neural network that affects the power consumption and processing speed can be measured by number of parameters (weights and so forth for a neural network) and/or floating point operations per second (FLOPs).

To achieve a better trade-off between resources and accuracy while performing neural network object detection, a system and method is disclosed herein that provides a tiny deep supervision object detection (Tiny-DSOD) framework that includes highly efficient architecture including (1) a depth-wise dense block (DDB) based backbone that performs detection of the objects, (2) depth-wise feature-pyramid-network (D-FPN) based front-end that performs the semantic classifying of the objects, or both (1) and (2).

In more detail, the present Tiny-DSOD is built upon deep supervision object detection (DSOD) as disclosed by Shen, Z. et al., "DSOD: Learning deeply supervised object detectors from scratch", ICCV, pp. 1937-1945 (2017), which is incorporated herein in its entirety for all purposes. This network provides a sequence of dense blocks where the output of each dense block is transitioned to each subsequent dense block in the same sequence. Such dense blocks were introduced in DenseNet-like (see Huang, G., et al, "Densely connected convolutional networks", CVPR (2017). This provides the output, and in turn the knowledge, of earlier blocks directly to all later blocks in the same sequence thereby providing an inherent system of deep layer supervision (or just deep supervision).

The present method and system uses a sequence of dense blocks except significantly modified by adding at least one depth-wise convolutional layer to each depth-wise dense block. Image data is often provided with multiple channels, and the method here analyzes each channel of input feature maps separately by performing per-channel 2D filtering. Each channel may have a different 2D filter kernel. Cross-channel results are then analyzed through a 1×1 point-wise convolution layer. This results in a more efficient computing and parameter analysis than regular convolution while maintaining accuracy with few or no visible drops. By one form, this depth-wise convolutional layer will be accompanied by a prior 1×1 convolutional bottleneck layer alone or with a subsequent 1×1 convolutional point-wise layer. Such a combined structure of dense blocks with depth-wise layers results in an extremely efficient neural network that significantly reduces resource usage by reducing the number of required computations while maintaining a sufficiently high accuracy. This DDB-based backbone also is much easier to train from "scratch" from sample data rather than fine-tuning known standard networks and models since relatively fewer training sets (or iterations) are needed. This is useful for many usages that are not in the RGB domain (and where fine-tuning is not feasible) such as medical images, depth images, multi-spectrum images, and so forth. The backbone also may use a stem that includes depth-wise convolutional layers to increase efficiency without lowering accuracy.

In addition, the object classifying front-end of the neural network has been made more efficient by providing a depth-wise feature pyramid structure that includes a downsampling pyramid followed by an upsampling pyramid that is significantly improved for efficiency as disclosed herein. In detail, a conventional front-end in SSD and/or DSOD structured networks have a downsampling part with increasingly smaller feature maps the deeper the feature map (or prediction layer) thereby forming a downsampling pyramid. Output from each prediction layer is provided directly for prediction analysis. A limitation of this structure, however, is that the shallower prediction layers at the start of the front-end often lack semantic information of objects since the data has not had a chance to be refined through many layers. This causes inaccuracy, especially with small objects, because the relatively large feature maps of the shallower layers will not have sufficiently precise information to capture details of smaller objects. This reduces the amount and precision of the data used as the basis of the prediction.

To overcome this problem, a two pyramid structure is used to re-direct the information flow from deeper and smaller feature maps at the deeper end of the conventional single pyramid structure, near the end of a first downsampling pyramid for example, to shallower larger layers near the start of the downsampling pyramid. This is accomplished by using a downsampling path and a reverse upsampling path that forms an upsampling pyramid, and the reverse upsampling path has been found to be very effective for small object detection. (see for example, Fu, C. Y. et al., "DSSD: Deconvolutional single shot detector", arXiv preprint arXiv:1701.06659 (2017)), and feature-pyramid-networks (FPN) (see Lin, T. Y., et al., "Feature pyramid networks for object detection", CVPR, pp. 936-944 (2017)). However, most of these conventional pyramid front end systems implement the reverse-path via deconvolution operations, which greatly increases the model complexity because deconvolution has about the same computing complexity of a convolutional layer thereby adding a computationally heavy layer to the network.

To resolve this difficulty and improve the efficiency of the front end, the present method and system provide a down sampling of the feature maps that includes the use of concatenation of output from a pooling stack and a depth-wise stack that includes at least one depth-wise convolutional layer to form the feature map for a next prediction layer in the downsampling pyramid. Then, the upsampling of feature maps includes a bilinear interpolation followed by a depth-wise convolutional layer to form a larger intermediate feature map for a next prediction layer in an upsampling pyramid. The intermediate feature map is then summed, element by element, with a feature map from the downloading pyramid that has a corresponding size to the current intermediate feature map, thereby forming a final upsampled feature map for the next prediction layer. This permits information from the shallower layers in the downloading pyramid to contribute to the information in the much later and refined layers in the upsampling pyramid, where the information is obtained to form predictions.

The results of this Tiny-DSOD structure include a significant reduction in the computational load while maintaining very good accuracy such that Tiny-DSOD is an excellent lightweight object detection system for low resource devices or other low power priority systems, such as with "always on" applications. Particularly, the network architecture described herein results in about ⅙ parameters and about ⅕ FLOPs relative to the smallest DSOD model (DSOD-smallest), and still maintains a similar accuracy. Also, Tiny-DSOD described herein has slightly less FLOPs relative to MobileNet-SSD, SqueezeNet-SSD, and Pelee networks, while only about ⅕-⅙ the number of parameters and about 2-8% better accuracy. Tiny-YOLO is considered the fastest conventional object detector with about 16 times more parameter size, about 7 times more FLOPs, and about 15% less accuracy than the Tiny-DSOD described herein. Thus, the described present Tiny-DSOD outperforms state-of-the-art methods (MobileNet-SSD-v1/v2, SqueezeDet, Pelee, Tiny YOLO, etc.) in all the three metrics (parameter-size, FLOPs, and accuracy) in each compared benchmark (PASCAL VOC 2007, KITTI, and Microsoft's confidential consortiums (COCO) framework). For instance, the disclosed tiny-DSOD achieves 72.1% mAP with only 0.95 M parameters and 1.06B FLOPs, which shows much improved and reduced resource requirements compared to the conventional systems.

Such reduction in resources, and better trade-off between accuracy and resources, permits small devices to have more capacity to use other applications while performing object detection and/or have longer lasting battery power, more processing capacity, and more memory capacity thereby improving the functioning of these small computing or computer devices. Thus, due to its high accuracy, small model size, and fast processing speed, Tiny-DSOD may have many potential applications on real-time video surveillance, mobile phone usages, autonomous driving usages, and usages for battery-powered devices, always-on devices, and so forth.

Referring to FIG. 1, a process 100 is provided for a method and system of deep supervision object detection for reducing resource usage. In the illustrated implementation, process 100 may include one or more operations, functions or actions 102 to 114 numbered evenly. By way of non-limiting example, process 100 may be described herein with reference to example image processing system 1100 of FIG. 11, and/or neural networks of FIGS. 3-9, and where relevant.

Process 100 may include "obtain image data of pixels of at least one image having content with one or more objects" 102. This operation may include obtaining pre-processed raw image data with RGB, YUV, or other color space values that include chroma and/or luminance values, and including non-human-visible color spaces such as infra-red, and so forth. The pixel values may be provided in many different additional forms such as gradients, histograms, and so forth. This also may include depth data such as from a depth map, model, and the like. This operation also may include any pre-processing necessary to convert raw image data into data that is compatible with input for the neural network described herein.

Process 100 may include "operate a neural network having at least one sequence of depth-wise dense blocks wherein each depth-wise dense block has at least one convolutional layer" 104. Thus, a deep supervision object detection neural network may have a backbone with at least one sequence of depth-wise dense blocks (DDBs). By one form, each sequence has four or six DDBs, and the backbone may have four sequences. By one example, a first sequence may have four DDBs while three more subsequent sequences may have six DDBs each. The sequences (or dense stages) may be separated by transition stages where each transition stage (or layer) may have a 1×1 point-wise convolutional layer to perform cross-channel analysis. By one form, the transition stages also each include a pooling layer, such as max pooling, but by other options, some but not all of the transition stages have a pooling layer, and by one particular form, the first two transition stages have pooling layers, but the last two transition stages do not have a pooling layer. Thus, by one example, for four dense stages, there are a total of four transition stages, one after each DDB. Other alternatives for the layer order in the neural network and the one or more sequences of the DDBs is provided below.

As to the propagation of image data (or more particularly, feature map values) through the DDB itself, and in order to "operate an individual depth-wise dense block" 106, this first may involve process 100 including "receive input from a previous layer and having multiple input channels" 108. Initially, image data may be provided to the neural networks in color space channels such as R, G, B channels for example for three channels at 300×300 pixels each, but could be other image data parameters and resolutions as described herein. Thereafter, each filter or kernel applied on a convolutional layer may form a separate output channel, and in turn a separate data input (or feature map) for the next layer. Thus, by one of the examples provided herein, the input channels per layer received by a DDB range from 128 to 256, although many variations could be used.

Then, process 100 may include "separately propagate, at the same depth-wise convolutional layer, channels of the multiple input channels" 110. For instance, the DDBs described herein have a 3×3 (referring to a 3×3 pixel filter or kernel) depth-wise (DW) convolutional layer where the filter has a stride of 1. By one form, the DDB also has a previous (or prior) 1×1 bottleneck convolutional layer that is a cross-channel layer that initially sets the number of channels that is to be input to the for the depth-wise layer. By one form, a predetermined bottleneck ratio is used, and/or a predetermined growth rate is used, to set and control (or is) the number of channels, and as described below. By one example, the growth rate may change from DDB sequence to sequence, and may change according to different formulas. Also, in the example herein, the number of output channels of a DDB change linearly from small to large as the DDB sequences are positioned along the neural network and from the first layer toward the last layer of the neural network (or in other words, as the network goes deeper for example).

This operation also may include "apply at least one separate filter to each propagating channel to form at least one separate feature map of each propagating channel that is separate from the feature maps of other channels" 112. Thus, each filter may have its own output channel from the depth-wise convolutional layer. Each filter may have different coefficient values to attempt to match a different small part of an object from a model of the neural network. By one form, an additional 1×1 point-wise convolutional layer may be provided after the depth-wise layer to remix the image data of the different channels.

Process 100 may include "concatenate together resulting data of multiple depth-wise dense blocks positioned prior to a next depth-wise dense block in the same sequence and to form input data of either the next depth-wise dense block in the sequence or a next layer of the neural network" 114. Thus, for this operation, once data is provided from the last layer within one of the DDBs, that output is directly forwarded to each of the subsequent DDB in the same sequence of DDBs. Directly here refers to avoiding other intercepting convolutional layers, and it will be understood that before or after each convolutional layer, other types of layers may be provided such as auxiliary layers including normalization such as batch normalization (BN), and sign changing layers such as rectified linear unit (ReLU) operation layers mentioned herein. Another way to describe the dense operation of the DDB sequence is to state that the input of each DDB, except the first DDB in the sequence, directly receives the concatenated image data output from each prior DDB in the same sequence as the current (or next) DDB receiving the data. The last DDB of a sequence of DDBs provides the concatenated image data to the next layer in the neural network, which may be a layer in a transition stage of the network.

By other alternatives, the backbone of the neural network also may have a stem including multiple convolutional layers before providing the resulting output feature maps to an extractor that has the DDB sequence(s). By one form, the stem has at least one depth-wise convolutional layer as well, and by one specific example, has depth-wise convolutional layers alternating with non-depth-wise convolutional layers.

Process 100 may include "classify the one or more objects at least partly depending on the output of the at least one sequence of depth-wise dense blocks in the neural network" 116. Once the data is ready for classification, a classifying front-end of the neural network may be used to determine the classifications of the objects detected at the backbone. By one form, this includes processing the image data (or feature maps) received from one or more of the transition layers (or stages) in the backbone. By one form, this may include obtaining the feature maps of the first and third transition stages of the backbone. Otherwise by another option, the feature maps of the last transition layer of the backbone is used.

By one form, a depth-wise feature pyramid network (D-FPN) is used as the front end, and this may include first downsampling the feature maps in a downsampling pyramid and then upsampling the feature maps in an upsampling pyramid, where the pyramids are placed tip to tip to form an hourglass side profile. The downsampling is performed by concatenating data from a pooling stack, which may be max pooling, and a DW stack with at least one DW convolutional layer. The DW stack may have a bottleneck 1×1 convolutional layer before the DW convolutional layer, and the pooling stack may have a 1×1 point-wise convolutional layer after the pooling layer. The upsampling may include bilinear interpolation applied to a feature map and then applying a DW convolutional layer. The resulting intermediate feature map is then summed element by element to a feature map from the downsampling pyramid, and by one form, to a down-sampled feature map with a size corresponding to the size of the intermediate results of the upsampling DW convolutional layer. The resulting data forms a prediction layer and the data is provided to a prediction unit that compares the values of the prediction layer to one or more thresholds for different objects, or parts of objects, for example, to determine semantic labels of the objects.

Referring now to FIG. 2, a sequence 200 of dense blocks 204, 206, 208, and 210 is provided to demonstrate dense block-to-block propagation that may be used in the DDB sequences of the disclosed neural network. By one form, the dense blocks 204, 206, 208, and 210 are the DDBs described herein. An input layer 202, may be a DDB itself or may be a neural network layer before the sequence 200 of DDBs. The input layer 202 may provide input data of multiple channels. As explained below, each DDB 204, 206, 208, and 210 may have its own depth-wise convolutional layer that separately analyzes the channels being propagated, the operation of the depth-wise layer on the DDBs and control of the number of channels is provided below.

When the input layer is not part of the DDB sequence, the input data may be provided only to the first DDB 204, but alternatively, could also be provided directly to each of the DDBs 204, 206, 208, and 210 of the sequence as if the input layer 202 is a DDB. Otherwise, if input layer 202 is a DDB that is part of the sequence, each of the DDBs 204, 206, 208, and 210 of the sequence 200 will receive the output from the input layer 202. Each DDB provides its output to each subsequent DDB in the sequence 200. Thus, DDB 204 provides its output to DDBs 206, 208, and 210; DDB 206 provides its output to DDB 208 and 210; and DDB 208 just provides its output to DDB 210. From the input perspective, all of the output data, or more particularly feature maps, from each of the DDBs is concatenated or fused together as one input vector (or matrix) to be input to a subsequent "next" DDB or before being providing to the next non-DDB layer after the DDB sequence. Thus, the output from DDBs 202 and 204 are fused before being provided to DDB 206, the output from DDBs 202, 204, and 206 are fused before being provided to DDB 208, and so on.

Referring to FIG. 3, a detailed architecture or layer order of a backbone 301 of a Tiny-DSOD network is provided to first detect the objects before a front-end of the neural network classifies the objects. Table 1 below lists the example layers and the parameters of the layers that may form the backbone 301. The backbone 301 may have a stem 302 followed by an extractor 304. The stem 302 provides an efficient way to simultaneously reduce feature map resolution while keeping a sufficient amount of object information during resolution downsampling with several lightweight convolution and/or depthwise convolution layers. Generally thereafter, the extractor 304 provides feature maps with values that indicate whether an object exists as well as the shape and position of the object.

TABLE 1

Example Layer Order of Backbone of a Deep Supervision Object Detection Neural Network

|  | Layer Type | Output Size | Component | No. |
|---|---|---|---|---|
| Stem (302) | Convolution | 64 × 150 × 150 | 3 × 3 Conv, stride 2 | 306 |
|  | Convolution | 64 × 150 × 150 | 1 × 1 Conv, stride 1 | 308 |
|  | DW Convolution | 64 × 150 × 150 | 3 × 3 DWconv, stride 1 | 310 |
|  | Convolution | 128 × 150 × 150 | 1 × 1 Conv, stride 1 | 312 |
|  | DW Convolution | 128 × 150 × 150 | 3 × 3 DWconv, stride 1 | 314 |
|  | Pooling | 128 × 75 × 75 | 2 × 2 max pool, stride 2 | 316 |
| Extractor (304) | Dense Stage 0 | 256 × 75 × 75 | DDB (32) *4 | 318 |
|  | Transition Stage 0 (320) | 128 × 38 × 38 | 1 × 1 Conv, stride 1 | 322 |
|  |  |  | 2 × 2 max pool, stride 2 | 324 |
|  | Dense Stage 1 | 416 × 38 × 38 | DDB (48) *6 | 326 |
|  | Transition Stage 1 (328) | 128 × 19 × 19 | 1 × 1 Conv, stride 1 | 330 |
|  |  |  | 2 × 2 max pool, stride 2 | 332 |
|  | Dense Stage 2 | 512 × 19 × 19 | DDB (64) *6 | 334 |
|  | Transition Stage 2 (336) | 256 × 19 × 19 | 1 × 1 Conv, stride 1 | 338 |
|  | Dense Stage 3 | 736 × 19 × 19 | DDB (80) *6 | 340 |
|  | Transition Stage 3 (342) | 64 × 19 × 19 | 1 × 1 Conv, stride 1 | 344 |

The backbone 301 may receive an input with multiple channels such as 3 channel 300×300 images where the channels are the RGB pixel color data for the present example. The stem 302 starts with one 3×3 regular convolutional layer 306 and one 1×1 pointwise convolutional layer 308, and then two depth-wise layers 310 and 314 are used with a 1×1 convolutional layer 312 between them. The depth-wise layers are provided to attempt to reduce computational load and parameters while maintaining accuracy as mentioned above. A pooling layer 316 is then used to reduce the data size. The pooling used is max pooling, but averaging or other pooling technique could be used instead. As shown on Table 1, the output size of each layer for both stem and extractor is provided as: (number of channels (or filters)×feature map width×feature map height), and the filter size as well as layer type and stride for each layer is shown in the component column.

Four DDB stages labeled dense stage 0 to 3 on Table 1 and DS 318, 326, 334, and 340 on backbone 301 are provided in the extractor 304 where each dense stage 0 to 3 has at least one sequence 319, 327, 335, and 341 of DDB blocks respectively. While each dense stage 0 to 3 has one sequence of DDBs here, other variations are possible where one or more of the dense stages may have sequences of dense blocks (DBs) but without depth-wise layers (for example, non-DDB blocks instead) as long as at least one the dense stages includes a sequence of DDBs. Also, while each DDB sequence is shown with consecutive DDB blocks, individual dense stages may have a DDB sequence without consecutive DDB blocks, where consecutive here, refers to convolutional layers considered within a DDB block versus other types of layers that could be placed between DDB blocks such as pooling layers or other non-convolutional layers, but not considering auxiliary layers such as normalization layers such as batch normalization (BN) layers, or sign changing layers such ReLU layers. By one form, a BN and ReLU layer directly follows each convolutional layer although not shown on the backbone 301 (or table 1). Thus, a single DS could have multiple sequences of consecutive DDBs, divided by one or more non-DS layers, or could have a single sequence with non-consecutive DDBs divided by non-DDB layers.

Also as shown on table 1, for each dense stage 0 to 3, the DDB sequence has (or is repeated) the number of times after the symbol "*". Thus, in the example shown, the first dense stage 0 has a DDB sequence 319 with four consecutive DDBs while the DDB sequences 1 to 3 each have a DDB sequence 327, 335, and 341 with six consecutive DDBs. While all four sequences could have the same number of DDBs, each or individual DDB sequences could have a different number of DDBs. Many variations of the components mentioned here are contemplated.

The number in the parenthesis DDB(g) is a growth rate g that also is the number of output channels (or filters) output from individual DDBs of a sequence of DDBs as explained elsewhere herein.

The transition stages (or layers) 320, 328, 336, and 342 are labeled TS and are positioned to alternate with the dense stages so that one transition stage operates after each dense stage, although other variations could be used. The transition stages act to fuse channel-wise information from the previous dense stage and compress the channel number for computing and parameter efficiency. By one approach, each TS has a point-wise convolutional layer (PT Conv) 322, 330, 338, and 344 respectively, but only the first two TSs 320 and 328 have a pooling layer 324 and 332 respectively, and here max pooling while other techniques such as average pooling could be used. It will be understood that all or more or less of the transition stages may have one or more pooling layers. Other details of the DDB sequences are provided below.

Figure 4:
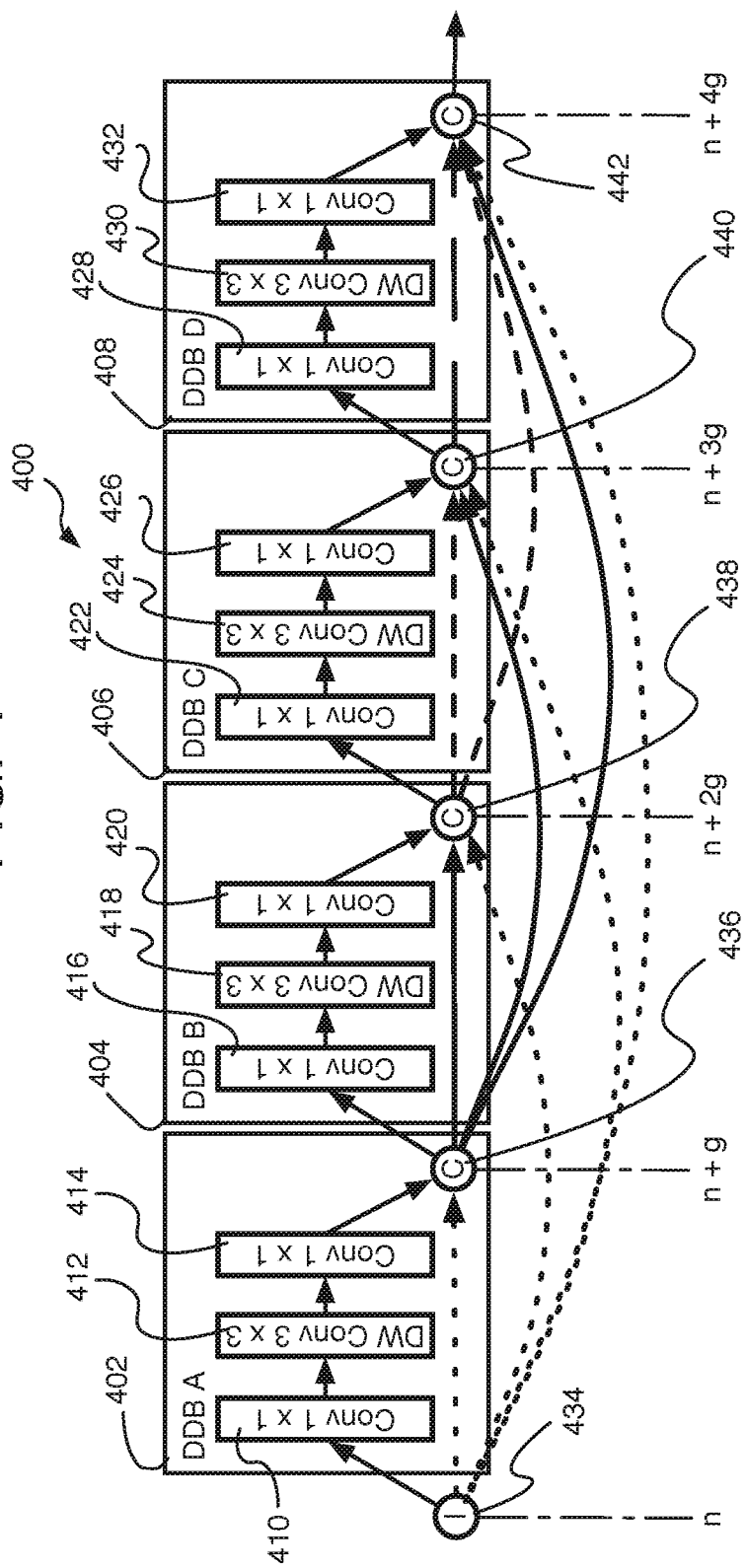
FIG. 4 is a schematic diagram of a sequence of depth-wise dense blocks for a neural network according to at least one of the implementations herein.
Figure 5:
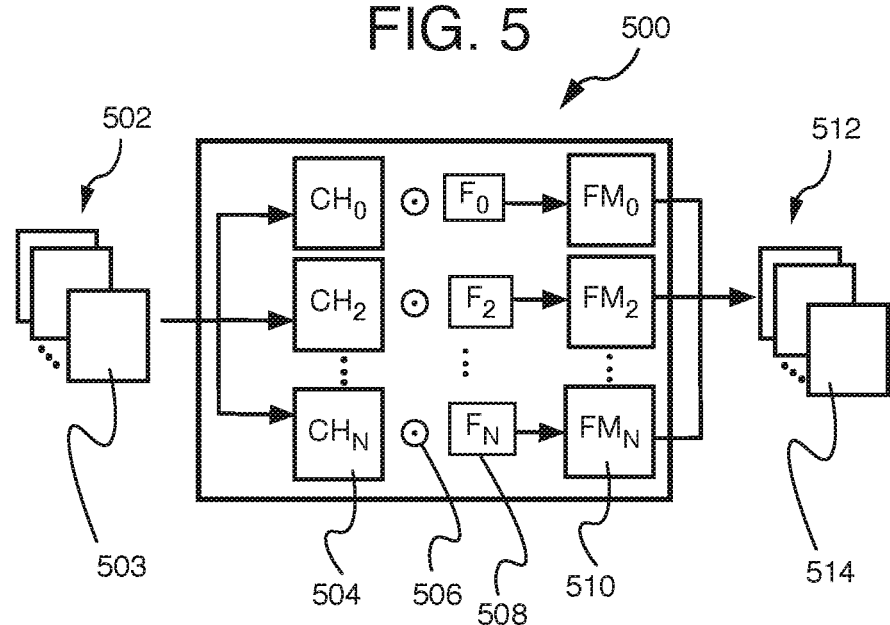
FIG. 5 is a schematic diagram of a depth-wise convolution layer of the depth-wise dense block of FIG. 4 or 6.
Figure 6:
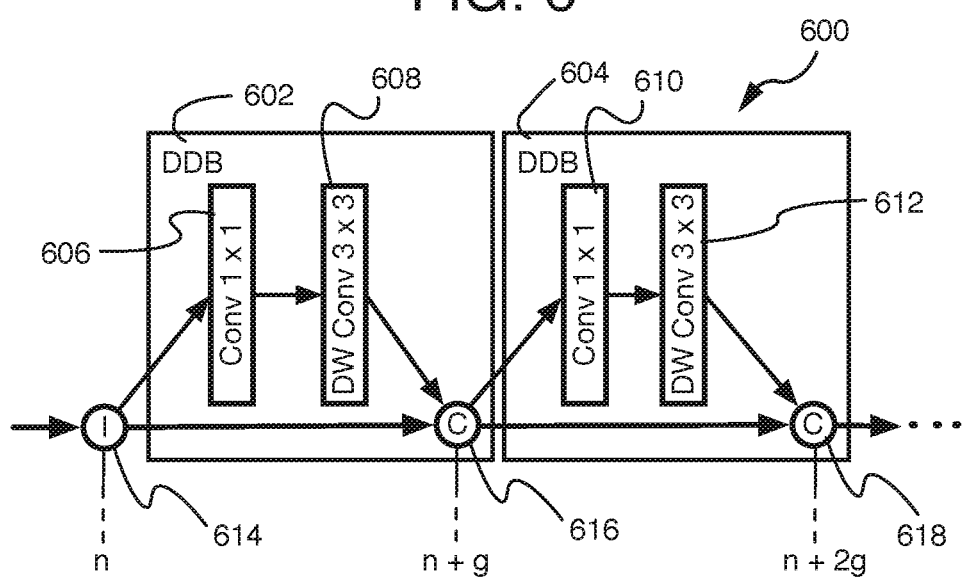
FIG. 6 is a schematic flow diagram of another sequence of depth-wise dense blocks of a neural network in accordance with at least one if the implementations herein.

Referring to FIGS. 4-6, two example DDB sequences 400 and 600 are provided and that are alternatively used at a single dense stage. Table 1 refers to the DDB sequence 600 (FIG. 6). Sequence 400 is explained first.

Referring to FIG. 4, one example DDB-sequence 400 provides four consecutive DDBs A (402), B (404), C (406), and D (408) respectively and in a single dense stage, such as dense stage 0 described above. The I-circle 434 indicates the input to the first DDB A (402) and has n output channels from a previous network layer and is now the number of input channels to DDB A 402.

Each DDB A to D here has a number of convolutional layers, such as three, and then ends with a concatenation operation shown as a C-circle 436, 438, or 442. To provide dense network operations, each concatenation C-circle concatenates or fuses output data from all previous DDBs in the sequence. The number under the C-circle (n+g) to (n+4g) indicates the number of output channels of the DDB as explained below. By one approach shown, the I-circle input data is provided to the first DDB and also is concatenated directly to each C-circle at the output of each DDB, as shown by the dotted line. By an alternative form, however, the input from I-circle to the first DDB A 402 is only provided to the first DDB A 402 and is not directly concatenated at the outputs of any of the DDBs A to D. By other forms, the I-circle input is provided to the first DDB A 402 and is only concatenated at C-circle 436 with the first DDB A 402 output and/or other selected individual DDBs.

Each DDB A to D in this example has three layers, a first point-wise bottleneck layer that is a 1×1 convolutional layer 410, 416, 422, or 428 respectively, each here with a stride of 1. Then, a 3×3 depth-wise convolutional (DW conv) layer 412, 418, 424, or 430 is used respectively in each DDB, and each with a stride of 1. Finally, a data reducing point-wise 1×1 convolutional layer 414, 420, 426, or 432 is used respectively, and each with a stride of 1. The bottleneck layers 410, 416, 422, or 428 are provided to reduce the number of inputs provided to the DW layers 412, 418, 424, or 430, while the second or subsequent point-wise layers are used to perform cross-channel analysis of the feature data separate from the individual channel analysis at the depth-wise layer for more accurate results with less parameters.

Referring to FIG. 5, an example depth-wise convolutional layer 500, that is the same or similar to the layers 412, 418, 424, or 430, is shown to explain the depth-wise operation. Input 502 may have a number of channels 503 that are provide to the DW layer 500. The channels are separated (or at least treated separately) as shown by channels 0 to N (504), and then one separate 2D (for instance 3×3) filter (or kernel) $F_0$ to $F_N$ may be applied to each channel. The operation of applying a filter to a channel is shown by the dot-circle (506). In the current example, one 3×3 filter is applied to each channel as shown here, and the filters may have different coefficients, and as generated during training of the neural network. More precisely, each channel has one 2D filter so that the number of input channels and output channels are the same for a depthwise convolutional layer. For instance, if the number of input channels is 64, the corresponding output channels is also 64. By one form, each channel may have a 3×3 2D filter kernel, or other size such as 5×5. The result is a set of feature maps $FM_0$ to $FM_N$ with one feature map per channel and per filter. In this example, as mentioned, one separate filter is applied to each channel. Thus, the term "separate" here refers to its application to an individual channel and not necessarily the contents of the filter. Thus, the filters could have a different size or shape, or simply different coefficients, or these could all be the same for the filter applied to all channels.

The output 512 with channels 514 then may be provided to the second 1×1 convolutional layer 414, 420, 426, or 432 in order to reduce the number of output channels generated by the DW layer 500 so that the number of output channels provided for concatenation (at a C-circle) is less than the number of output channels N. For DDB sequence 600 described below, the 1×1 point-wise layer is omitted, and the set of output feature maps N are provided for concatenation at the DDB instead.

Returning again to FIG. 4, and with regard to the control of the number of output channels for each layer, the DDB sequence 400 also may be described as stacked DDBs parameterized by growth rate g and bottleneck (or expansion) ratio w. Particularly, the three layer arrangement (bottleneck-DW-PW) of the DDB first expands the input channels w times to generate w×n output channels of the layer 410, where n also is the number of input channels input to the first DDB A 402 as mentioned above, and bottleneck ratio w is an integer hyperparameter to control the model capacity. The bottleneck ratio w may be set the same for all DDBs in the same DDB sequence, but could be set the same for all sequences in the same extractor as well. While bottleneck ratio w acts to expand the number of output channels from the input I-circle 434 to the DW convolutional layer 412 by using the bottleneck layer 410, the bottleneck ratio w also acts to set a limit to the growth of the number of output channels. The bottleneck ratio w is predetermined during training of the neural network until satisfactory results are reached, and then may be fixed for the actual run-time of the neural network.

When the depth-wise convolution layer 412 is applied, the same number of output channels (w×n) is maintained by providing one filter per channel. Then, the second 1×1 convolutional layer 414 obtains the output from the DW convolutional layer 412 and projects feature maps to g output channels, where g is the growth rate of the DDB A 402. Finally, concatenation is used to merge the input and output feature maps together, instead of the residual addition operation in MobileNet-v2. See Sandler, M., et al., "Inverted residuals and linear bottlenecks: Mobile networks for classification, detection and segmentation", arXiv preprint arXiv:1801.04381 (2018). The resulting number of output channels of DDB A (402) is n+g. The growth g also is predetermined during training of the neural network until satisfactory results are reached, and then may be fixed for a particular DDB during the actual run-time of the neural network.

Since DDB sequence 400 has two hyper-parameters w and g, the DDB sequence 400 is denoted as DDB(w, g). If L DDB blocks are stacked in one stage, the Overall complexity of the stacked structure is $O(L^3g^2)$, where L is the number of blocks in a sequence. Thus, resources will grow rapidly with L so that g should be controlled to be a relatively small number.

The three layer pattern (bottleneck-DW-PW) repeats for each DDB so that the bottleneck layer sets the number of output channels to be repeated for the DW layer, and the point-wise layer after the DW layer reduces the number of output channels to n plus some multiple of g. The number of output channels changes for each DDB block since the number of inputted channels from the concatenation at the previous block also changes. Thus, since the output channels for DDB A 402 is n+g, the output channels for the three interior layers of the next DDB B 404 in order are w×(n+g), w×(n+g), and g. After the concatenation with the previous DDB output, the final number of output channels of DDB B is n+2g. Likewise, the number of output channels of each layer of DDB C is w×(n+2g), w×(n+2g), and g so that the number of output channels of the DDB C after concatenation is n+3g; while the number of output channels of each layer of DDB D is w×(n+3g), w×(n+3g), and g so that the number of output channels of the DDB D after concatenation is n+4g.

Referring now to FIG. 6, a dense stage has a DDB sequence 600 with a couple of the DDB blocks is shown (not all DDB blocks in the sequence are shown). While only two DDBs 602 and 604 are shown, it will be understood a sequence of four, six or some other number of DDBs may be provided in a single DDB sequence. The DDB sequences 600 here are listed on Table 1.

It was observed that the piece-wise layer after the DW layer in a DDB from DDB sequence 400 was at least mostly redundant to the bottleneck layer of the next adjacent DDB so that one of the 1×1 convolutional piecewise layers could be eliminated without significantly reducing the improved characteristics of the neural network. Thus, DDB sequence 600 has two layers in each or individual DDBs 602 or 604 instead of three layers, and includes the 1×1 convolutional bottleneck layer 606 that first compresses the input channels to the size of growth rate g, and then has a 3×3 DW convolutional layer 608 or 612 to perform depth-wise convolution. The resulting data is the output channels (or set of feature maps) of the depth-wise convolution (DW conv) layer 612 which is directly concatenated with the output of the other prior DDBs (and/or the input from I-circle) without the extra point-wise 1×1 convolutional layer projection. This is repeated for each DDB in the sequence.

In this case, the bottleneck ratio w is not used, and the DDB sequence 600 may be described as a stacked DDB sequence parameterized by growth rate g. The overall complexity $O(L^2g^2)$ of L stacked DDBs on DDB(g) sequence 600 is much lower than that of DDB(w×n) sequence 400 because the first two layers in each DDB(w×n) block are functional depending on variable n, while the DDB(g) only has the first layer functional depending on variable n, so that the complexity of DDB(w×n) is $O(L^3g^2)$. Consequently, when the number of DDB blocks is fixed as L, DDB(g) allows for a much larger g value compared to DDB(w×n) when putting the whole network into processor memory during a training procedure. The larger g will compensate for possible accuracy loss. This also results in better accuracy than the DDB(w×n) sequence 400 under similar resource constraints in addition to the increase in efficiency.

For these examples of DDB sequences 400 and 600, while growth rate g may be set the same for all DDBs in the same sequence, a variational growth rate strategy can be used that sets g differently for different DDB sequences in the neural network by assigning a smaller g to shallower (towards the start of the neural network) stages with large spatial size, and increasing g linearly with each deeper stage (towards the end of the neural network). Thus, by the present example on table 1 and backbone 301, the growth rate g may be varied from sequence to sequence, and here by a linear formula g=16(DS)+32, where DS=0 to 3 as on Table 1 so that g is 32, 48, 64, and 80 respectively for DS 0 to 3. Other variations could be used instead of a linearly increasing strategy.

Otherwise, the operation of the depth-wise dense blocks 602 and 604 is the same or similar to that as shown for DDB sequence 400.

Figure 7:
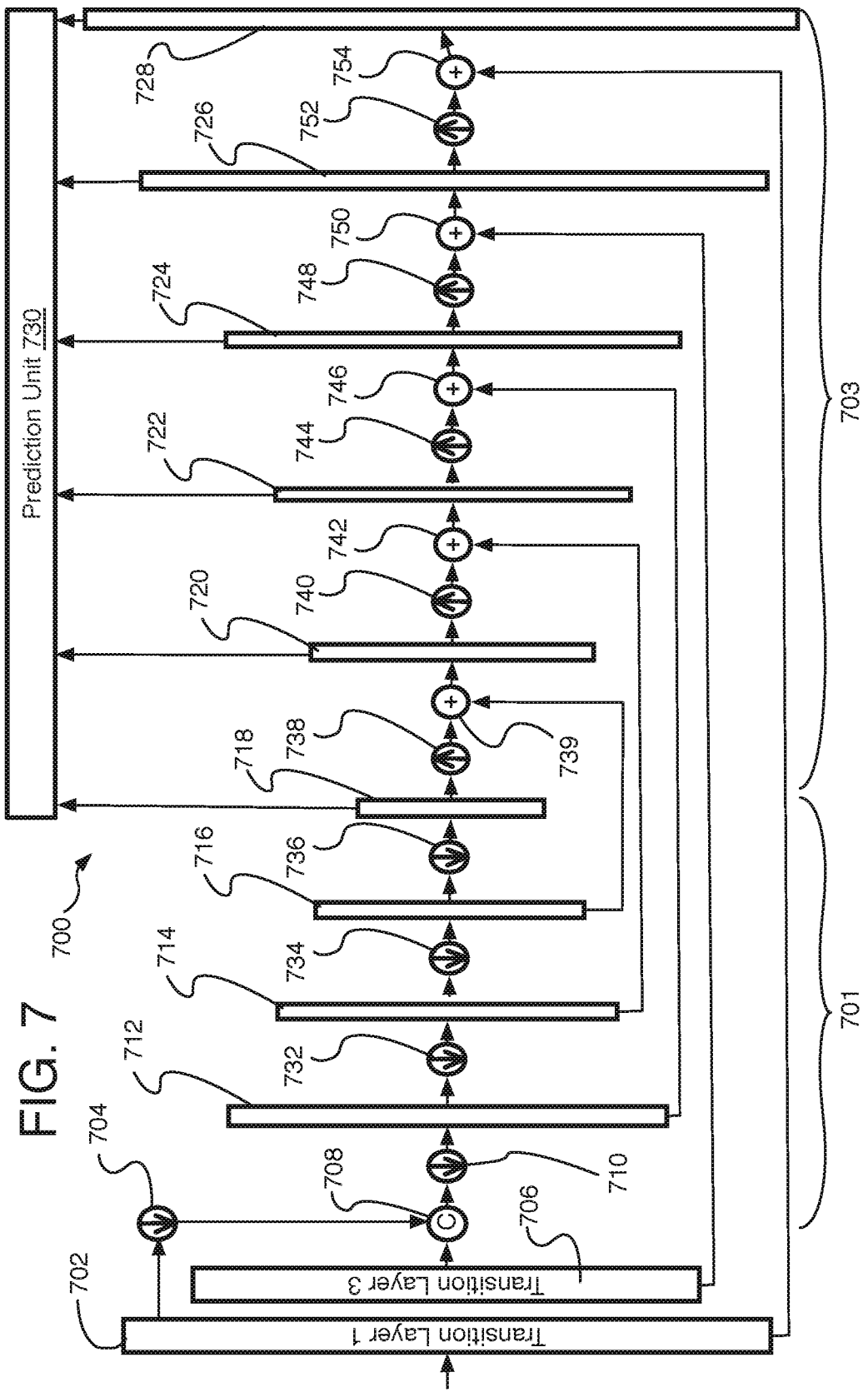
FIG. 7 is a schematic diagram of a depth-wise feature-pyramid network in accordance with at least one if the implementations herein.

Referring to FIG. 7, a depth-wise feature pyramid network (D-FPN) based predictor or front-end 700 is provided to semantically classify detected objects in a cost-efficient manner that uses information from the shallow layers of a downloading pyramid while efficiently obtaining information for predictions without using complex deconvolution operations as mentioned above. To accomplish one or more of these advantages, front-end or predictor 700 has a down-sampling pyramid 701 followed by an upsampling pyramid 703 placed tip to tip to form an hour glass profile. This configuration performs the upsampling and downsampling in a much more efficient way by using depth-wise convolution as explained in detail in the following. On front end 700, the circled down-arrow symbol represents a downsampling operation, the circled up-arrow symbol represents an upsampling operation, the C-circle represents concatenation, and the circled plus symbol represents a summation operation all as described below. Each prediction layer shown 712 to 728 numbered evenly has a depicted size that represents an upsampled or downsampled size of the one or more feature maps of that particular prediction layer to show the relative size of the feature maps among the upsampled or downsampled prediction layers. The details are provided as follows.

The front end 700 first obtains data in the form of feature maps from one or more transition stages (or layers) of the backbone, such as backbone 301 (FIG. 3). Here, one or more feature maps are obtained from transition layer 1 702 (328 on Table 1 and backbone 301) and transition layer 3 706 (342 on Table 1 and backbone 301) which is the last transition layer (and the last layer generally) of the backbone 301. However, it will be understood that many different variations could be used, including obtaining data from more or less of the transition layers, or from different layers of the backbone 301, and/or in a different order than that shown on front-end 700

The feature map or maps of transition layer 1 may be downsampled 704 and then concatenated 708 with the feature maps of transition layer 3 before being downsampled 710 again to form a downsampled feature map or maps for a prediction layer 712 that is considered a first layer of the downsampling pyramid 701. The down sampling is then repeated to form at least three other prediction layers 714, 716, and 718 with the downsampling operations 732, 734, and 736 respectively, although less or more such downsampled layers (each with one or more feature maps) could be used instead.

Figure 8:
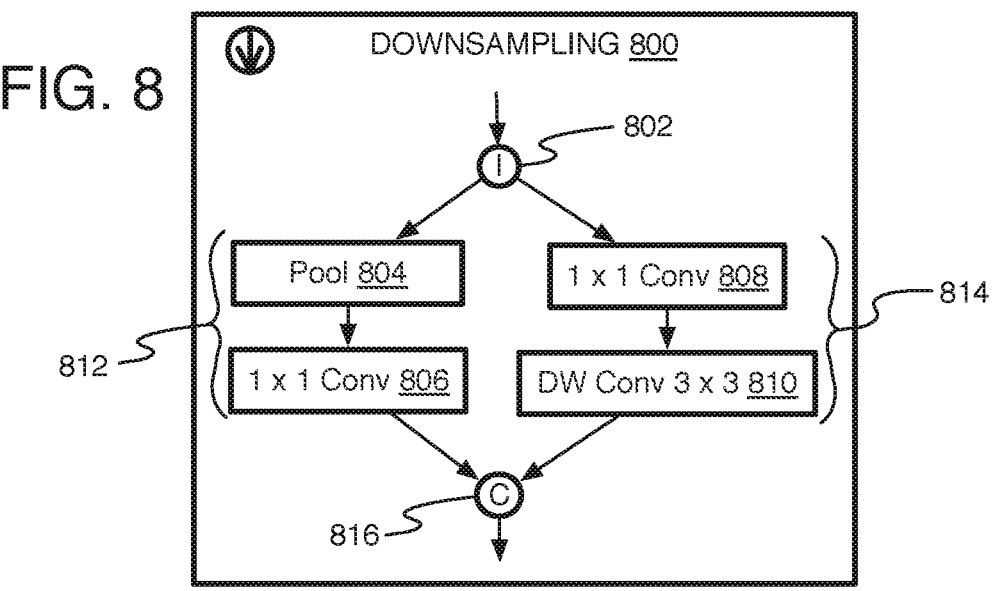
FIG. 8 is a schematic diagram of upsampling feature maps for a depth-wise feature-pyramid network in accordance with at least one if the implementations herein.

Referring to FIG. 8, a downsampling operation 800 (same as downsampling operation 704, 710, 732, 734, and 736) is explained and includes providing input image data 802 of a feature map and provided to both a pooling stack 812 and a depth-wise (DW) stack 814. The pooling stack 812 has a pool layer 804 that may be a 2×2 max pooling layer with a stride of 2, but could use averaging or other pooling technique instead. This provides downsampling by a factor of two which is maintained for each downsampling operation 704, 710, 732, 734, and 736, but could be varied from operation to operation. The pooled feature map is then provided as input to a 1×1 point-wise convolutional layer 806 with a stride of 1 and resulting in 64 output channels as the result of the pooling stack 812.

For the depth-wise stack 814, the same input is received by a 1×1 piece-wise convolutional layer 808 with a stride of 2 and resulting in 64 output channels, which are then provided to a depth-wise convolutional layer 810 with a stride of 2 and also providing 64 output channels. The results of the pooling stack 812 and depth-wise stack 814 are then concatenated 816 for fusing to form a single feature map. This is repeated for downsampling of each or individual feature maps of a prediction layer being analyzed.

Returning to FIG. 7, the upsampling pyramid 703 of the front end 700 upsamples the resulting feature map(s) of the last prediction layer 718 from the downsampling pyramid 701. The upsampling is then repeated to generate upsampled prediction layers 720, 722, 724, 726, and finally 728 each with one or more upsampled feature maps, although less or more prediction layers could be generated as desired. In particular, the upsampling pyramid 703 starts by applying an upsampling operation 738 to the feature maps of the last prediction layer 718 of the downsampling pyramid 701. An upsampled feature map is considered an intermediate feature map that is then summed element-by-element to one of the downsampled feature maps from the downsampling pyramid 701, and here to feature map of prediction layer 716 which has a size corresponding to the size of the feature map resulting from the upsampling of the feature map of prediction layer 718. This results in a main or final upsampled feature map for prediction layer 720 that is formed by factoring the information from both the previous feature map but also an earlier feature map of the downsampling pyramid 701 to better capture shallower information. This is represented by the arrow from the downsampling prediction layer with a similar size (such as layer 716) to the summation symbol 739. These operations of upsampling 738, 740, 744, 748, 752 and then summation 739, 742, 746, 750, and 754 with a downsampled feature map of a corresponding size are respectively repeated to generate each upsampled feature map of prediction layers 720, 722, 724, 726, and finally 728, but could be used to generate less than all feature maps by using other techniques as well to generate at least some of the upsampled feature maps.

Figure 9:
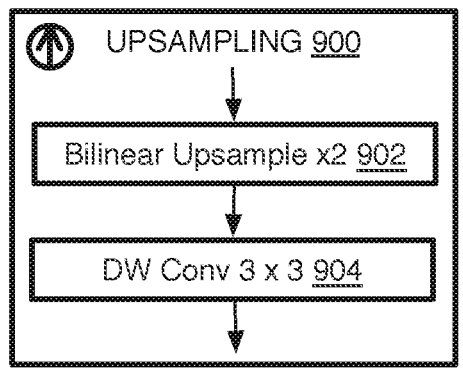
FIG. 9 is a schematic diagram of downsampling feature maps for a depth-wise feature-pyramid network in accordance with at least one if the implementations herein.

Referring to FIG. 9, the upsampling operation 900 (which is the same as operation 738, 740, 744, 748, and 752) first includes a bilinear upsampling layer 902 that upsamples by a factor of two, and this is the same for the generation of each of the upsampling layers although varying factors, or a different uniform factor, could be used instead. The resulting upsampled feature maps are then provided to a depth-wise 3×3 convolutional layer 904 with a stride of 2 and that generates a layer with 128 output channels (or feature maps) as the result of the upsampling operation 900. By one approach, thereafter the channels are treated separately throughout the upsampling pyramid 703 without cross-channel re-combination, such as by 1×1 point-wise layers for example. Also, it will be noted that BN, ReLU, and/or other auxiliary layers may be applied before or after each convolutional layer of the front end as well.

Once the feature maps are upsampled, the feature maps, starting with the feature map(s) of prediction layer 718 that is the last downsampled feature map, are provided to a prediction unit 730 that compares the values of the feature maps, or values based on the feature maps, to thresholds for example to semantically classify the detected objects, although other techniques could be used. The evaluations below show that D-FPN can achieve a considerable detection accuracy boost with very slight increases of computation cost.

Referring to FIGS. 10A-10B, a process 1000 is provided for a method and system of deep supervision object detection for reducing resource usage. In the illustrated implementation, process 1000 may include one or more operations, functions or actions 1002 to 1028 numbered evenly. By way of non-limiting example, process 1000 may be described herein with reference to example image processing system 1100 of FIG. 11, and/or neural networks of FIGS. 3-9, and where relevant.

Process 1000 may include "train neural network from original sample data" 1002. This is a preliminary off-line operation, and the advantage here is that the neural network with DDBs is easier to train from scratch (or from original sample data) rather than fine-tuning a standard pre-trained neural network. Specifically, the training of the above mentioned architecture of a tiny-DSOD neural network in supervised-learning settings may include a training set of RGB (or other domain) images where each image has semantic information. The semantic information may be mapped to determine a ground truth of object bounding boxes in the images, which can be obtained by estimating the bounding box of every object in each image through the prediction layer or by other known automatic methods. The training then may involve initialization by training a standard object localization network to match the prediction output to the ground truth as a loss function for the supervision. The next training operation may involve data preparation, which refers to generating training data for the present Tiny-DSOD neural network architecture using the ground truth outputs to provide a supervised system and adjusting tunable parameters such as state weights and filter coefficients to be used for the final run-time neural network. Since the DDB sequences are so efficient, significantly fewer training iterations are needed to perform the parameter tuning compared to conventional neural networks for object detection with sematic classification. The training from scratch also proves to be less dependent on the number of training samples. The training can be completed with a relatively small number of training samples. It will be understood, however, that fine-tuning or other types of training could be used instead.

Then during run-time, process 1000 may include "obtain image data of pixels of at least one image having content with one or more objects" 1004. This operation may include obtaining pre-processed raw image data with RGB, YUV, or other color space values that include chroma and/or luminance values, and including non-human-visible color spaces such as infra-red, and so forth.

Process 1000 may include "perform pre-NN operations to convert raw input to input data compatible with a deep supervision object detection neural network" 1006. This operation also may include any pre-processing necessary to convert raw image data into data that is compatible with input for the neural network described herein. The pre-processing may include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth. Also, the raw pixel values may be converted to many different alternative forms such as gradients, histograms, depth values such as on a depth map, and so forth. Thus, the conversion of image data to be compatible with the neural network also may include an initial feature extraction operation, such as those using gradients to identify (or provide probabilities for) object edges or corners for example where the probabilities may be used as inputs to the neural network. It will be understood that the neural network herein is not limited to any one particular format and type of image data as the input.

Process 1000 may include "propagate input through the deep supervision object detection neural network backbone" 1008, and this may include "propagate data through stem using at least one depth-wise convolution layer" 1010, and through a stem of a backbone of the neural network. As described above, the stem may have a series of convolutional layers including at least one, but here two, depth-wise convolutional layers either consecutive or as here spaced apart by at least one regular convolutional layer. The stem may end with a pooling layer after the second DW layer by one example.

The process 1000 may include "propagate data through extractor using at least one sequence of depth-wise dense blocks and at least one transition layer after each block" 1012. The extractor of the backbone may include at least one, but here four, sequences of DDBs forming a dense stage where the dense stages are either positioned consecutively or spaced from each other by at least one transition stage. The individual DDB may have at least a bottleneck layer and at least one depth-wise convolutional layer as described above. By some options, a final point-wise convolutional layer may be provided after the depth-wise convolutional layer and within the DDB as well. The DDBs may be consecutive within a single sequence or may be spaced from each other by other types of layers. The DDB sequence forms the denseness by having each DDB in a sequence directly forward its output to each subsequent DDB in the same sequence that concatenates the output from previous DDBs with the its own current output before passing the concatenated output to be input to a next DDB. The transition layers at least have one cross-channel point-wise convolutional layer but also may have a pooling layer as well. By one example, the earlier (or shallower) transition stages have the pooling layer while the deeper transition stages do not have the pooling layer. The combination of depth-wise convolutional layer and dense block data connections provides a very efficient neural network with reduces FLOPs and parameters while maintaining relatively high accuracy.

Next, process 1000 may include "propagate data through front-end of the neural network" 1014, and as described above, may include "obtain data from at least one interior transition layer of the neural network backbone" 1016. This refers to the fact that the input data for the front end not only receives data from the last layer of the backbone, which in the current example is a transition layer (or stage), but also at least one transition layer (or stage) before the last transition layer in the backbone. For example, out of four transition stages, the second and fourth transition stages are used to provide data to the front end. The transition image data (or feature maps) may be immediately downsampled and concatenated as described above for front end 700 (FIG. 7).

Then, process 1000 may include "use depth-wise feature-pyramid network" 1018, which first includes "perform downsampling operations concatenating a pooling stack with a depth-wise stack with at least one depth-wise convolutional layer" 1020. Thus, a pooling stack and a depth-wise stack are separately applied to input data from a previous layer (or feature map) and then concatenated back together. The pooling stack may have a 2×2 max pooling layer while the depth-wise stack has a 3×3 depth-wise convolutional layer that outputs 64 channels by one example. Both stacks may have point-wise cross-channel layers as well, and the result of the downsampling operation is 64 output channels that are concatenated together. This is repeated to downsample each feature map in the downsampling pyramid, thereby forming a series of downsampled prediction layers having the downsampled feature maps.

Then, for the upsampling pyramid, process 1000 may include "perform upsampling operations with bilinear interpolation before at least one depth-wise convolutional layer" 1022. The bilinear interpolation performs upsampling by a factor of 2. The DW layer may be a 3×3 convolutional layer providing 128 output channels of intermediate feature maps. This is repeated to generate each intermediate upsampled feature map for a prediction layer. Using the depth-wise convolutional layers to perform the upsampling or downsampling or both creates a very efficient system with reduced parameters while maintaining very good accuracy.

Process 1000 also may include "sum elements of upsampled feature map with elements of downsampled feature map after individual upsampling operations" 1024. As described above, after each or individual upsampling operation, an upsampled intermediate feature map is formed, and a summation operation is performed to form a final upsampled feature map for a next prediction layer. The summation includes an element-by-element summation of values from the upsampled intermediate feature map and a downsampled feature map from the downsampling pyramid. By one form, the downsampled feature map selected for the summation has a size corresponding to the size of the upsampled intermediate feature map it is being summed with.

Process 1000 may include "perform post-NN computations with output probabilities of semantic object classifications to identify the one or more objects" 1026, where the upsampled feature maps, or the data based on the feature maps, are provided from the prediction layers to a prediction unit to compare the values to thresholds for example to determine the semantic label of the detected objects. Other methods could be used instead.

Process 1000 may include "use identities of objects for applications" 1028, where many different applications can use the identification of the objects whether automatic vehicle driving (or self-driving, autonomous driving, or autopilot) applications, robotics, computer vision applications, medical diagnosis applications, augmented and/or mixed reality headsets, and so forth.

Experiments

Experiments were conducted on three popular benchmarks (PASCAL VOC 2007 (see Everingham, M., et al., cited above), KITTI (see Geiger, A., et al., cited above), and COCO (see Lin, T. Y., et al., "Microsoft COCO: Common objects in context", ECCV (2014)), and compared Tiny-DSOD to state-of-the-art ultra-efficient object detection solutions such as Tiny-YOLO (see Redmond, J., et al. cited above), MobileNet-SSD (v1 & v2) (see Howard, A., et al., "Mobilenets: Efficient convolutional neural networks for mobile vision applications", arXiv preprint arXiv: 1704.04861 (2017)); (see Sandler, M. et al. cited above), SqueezeDet (see Wu, B. et al., cited above), Pelee (see Li, X. et al., cited above), and so forth. Results show that Tiny-DSOD outperforms these solutions in all three metrics (parameter-size, floating point operations per second (FLOPs), accuracy) in each comparison. For instance, Tiny-DSOD achieves 72.1% mean Average Precision (mAP) (https://medium.com/@jonathan_hui/map-mean-average-precision-for-object-detection-45c121a31173) with only 0.95 M parameters and 1.06B FLOPs, which is significantly better than the conventional systems while providing a low resource requirement.

Configuration Alternative Comparisons

The configuration settings of the different alternative backbones extractors and front end of the Tiny-DSOD framework described above were compared to each other by using a PASCAL VOC 2007 dataset. Table-2 summarizes the results.

TABLE 2

Ablation Study on PASCAL VOC2007 test set

| Row | DDB-a | DDB-b | D-FPN | Configuration | #Params | FLOPs | mAP(%) |
|---|---|---|---|---|---|---|---|
| (1) | ✓ | | | G/8-8-8-24, w = 2 | 0.90M | 1.68B | 63.1 |
| (2) | ✓ | | | G/8-8-16-16, w = 2 | 0.97M | 1.73B | 64.6 |
| (3) | | ✓ | | G/32-40-56-80 | 0.82M | 0.92B | 69.3 |
| (4) | | ✓ | | G/48-48-64-64 | 0.89M | 1.25B | 70.3 |
| (5) | | ✓ | | G/56-56-56-56 | 0.90M | 1.35B | 70.5 |
| (6) | | ✓ | | G/32-48-64-80 | 0.90M | 1.03B | 70.2 |
| (7) | | ✓ | ✓ | G/32-48-64-80 | 0.95M | 1.06B | 72.1 | where DDB-a is a DDB(g) configuration, DDB-b is a DDB(w,g) configuration, and D-FPN is the front end configuration using depth-wise convolutional layers as well as other structure as described above. The number-series G/g0-g1-g2-g3 in the "configuration" column is used to describe the network settings where "gi" is the growth rate of DDB in the i-th dense stage, and w is the expansion (or bottleneck) ratio of DDB(w, g). A checkmark "4" indicates a certain configuration identified for the column is adopted in the evaluated network (row-wise), and otherwise a blank space indicates the configuration was not used. Table 2 shows that under similar resource usages (#parameters), DDB-b based backbone performs much better (on FLOPs and accuracy) than that of DDB-a. Also, D-FPN can bring noticeable accuracy improvement with very small parameter and FLOP increases.

Benchmark on PASCAL VOC 2007

Tiny-DSOD on the PASCAL VOC 2007 testset also was compared to existing full-sized and lightweight models under the same settings for training. Table-3 shows the results.

TABLE 3

Comparison to Conventional Object Detection Neural Networks

| Method | Input size | Backbone | FPS | #Params | FLOPs | mAP(%) |
|---|---|---|---|---|---|---|
| Faster-RCNN | 600 × 1000 | VGGNet | 7 | 134.70M | 181.12B | 73.2 |
| R-FCN | 600 × 1000 | ResNet-50 | 11 | 31.90M | — | 77.4 |

TABLE 3-continued

Comparison to Conventional Object Detection Neural Networks

| Method | Input size | Backbone | FPS | #Params | FLOPs | mAP(%) |
|---|---|---|---|---|---|---|
| SSD | 300 × 300 | VGGNet | 46 | 26.30M | 31.75B | 77.2 |
| YOLO | 448 × 448 | — | 45 | 188.25M | 40.19B | 63.4 |
| YOLOv2 | 416 × 416 | Darknet-19 | 67 | 48.20M | 34.90B | 76.8 |
| DSOD | 300 × 300 | DS/64-192-48-1 | 17.4 | 14.80M | 15.07B | 77.7 |
| Tiny-YOLO | 416 × 416 | — | 207 | 15.12M | 6.97B | 57.1 |
| SqueezeNet-SSD*[1] | 300 × 300 | SqueezeNet | 44.7 | 5.50M | 1.18B | 64.3 |
| MobileNet-SSD*[2] | 300 × 300 | MobileNet | 59.3 | 5.50M | 1.14B | 68.0 |
| DSOD small | 300 × 300 | DS/64-64-16-1 | 27.8 | 5.90M | 5.29B | 73.6 |
| Pelee | 300 × 300 | PeleeNet | — | 5.98M | 1.21B | 70.9 |
| Tiny-DSOD | 300 × 300 | G/32-48-64-80 | 78 | 0.95M | 1.06B | 72.1 | where "*" indicates that these open-source models were tested for these experiments because known speed reports could not be obtained, and FPS stand for frames per second to show the object detection analysis speed. The networks above the double line are full-sized models, while networks below the double line are lightweight models. Each of these models has been described in articles already cited above).

The Tiny-DSOD achieves 72.1% mAP, which is significantly better than most lightweight detectors, except DSOD-smallest model. However, Tiny-DSOD has only ⅙ parameters and ⅕ FLOPs compared to the DSOD-smallest model. When comparing the Tiny-DSOD model with the state-of-the-art full-sized models, there is still marginal accuracy drops such that Tiny-DSOD has lightly lower accuracy compared to some of the full size models. However, Tiny-DSOD requires much smaller persistent memory for model storage and much less computing cost. For instance, Faster-RCNN is just 1.1% higher in accuracy than Tiny-DSOD, while with more than 140× larger model-size and 180× more theoretic computing cost (practically, 10× slower in fps). These comparisons show that Tiny-DSOD achieves a much better trade-off between resources (model size (indicated by number of parameters) and FLOPs) and detection accuracy, which is extremely useful for resource-restricted usages.

Note the Tiny-DSOD has much smaller FLOPs than Tiny-YOLO but the practical speed is much slower than the Tiny-YOLO. The difference in speed is due to Tiny-YOLO's desirably plain network structure, which is easy for optimization, and the Tiny-YOLO tested has tailored GPU implementation optimization. On the other hand, Tiny-DSOD directly uses Caffe without any additional optimization, where Caffe has less efficient implementation for the depth-wise convolution. Thus, Tiny-DSOD could run at a much faster speed when an object detection system provides customized implementations and/or optimizations for depth-wise convolution.

Benchmark on KITTI 2D Object Detection

Next, the Tiny-DSOD was tested with autonomous driving usages for a KITTI 2D object detection task. Different from PASCAL VOC, the KITTI dataset is composed of extremely wide images of size 1242×375. To avoid the vanishing of small objects, the input image was resized to 1200×300 instead of 300×300. This resolution will increase the FLOPs for the Tiny-DSOD but will maintain good detection accuracy. The results on a validation set are reported in Table-4.

TABLE 4

KITTI 2D object detection results.

| Method | Input size | #Params | FLOPs | Car | Cyclist | Person | mAP(%) |
|---|---|---|---|---|---|---|---|
| MS-CNN | 1242 × 375 | 80M | — | 85.0 | 75.2 | 75.3 | 78.5 |
| FRCN | 2000 × 604 | 121.2M | — | 86.0 | — | — | — |
| ConvDet | 1242 × 375 | 8.78M | 61.3B | 86.7 | 80.0 | 61.5 | 76.1 |
| SqueezeDet | 1242 × 375 | 1.98M | 9.7B | 82.9 | 76.8 | 70.4 | 76.7 |
| Tiny-DSOD | 1200 × 300 | 0.85M | 4.1B | 88.3 | 73.6 | 69.1 | 77.0 | where the numbers under each category (car, cyclist, person) are the corresponding average precision (AP in %). The column "mAP" is the mean AP over three categories. While the lightweight models are detailed in articles cited above, the full size model MS-CNN is disclosed by Cai, Z., et al., "A unified multi-scale deep convolutional neural network for fast object detection", ECCV (2016), FRCN is disclosed by Ashraf, K. et al., "Shallow networks for high-accuracy road object detection", arXiv preprint arXiv:1606.01561 (2016), and ConvDet is disclosed by Wu, B. et al., "Squeezedet: Unified, small, low power fully convolutional neural networks for real-time object detection for autonomous driving", CVPR Workshops (2017).

The Tiny-DSOD achieves a competitive result of 77.0% mAP, which is slightly better than state-of-the-art SqueezeDet (77.0% vs 76.7%), while the Tiny-DSOD model has only ½ model size and ½ FLOPs of computing compared to SqueezeDet, indicating that Tiny-DSOD is much more efficient under this scenario.

Benchmark on COCO

Finally, the performance of the disclosed method was evaluated on a large-scale COCO dataset. The test results are summarized in Table-5

TABLE 5

COCO object detection results.

| Method | Input size | FLOPs | #Params | AP (%), IOU 0.5:0.95 | 0.5 | 0.75 |
|---|---|---|---|---|---|---|
| SSD | 300 × 300 | 34.36B | 34.30M | 25.1 | 43.1 | 25.8 |
| YOLOv2 | 416 × 416 | 17.50B | 67.43M | 21.6 | 44.0 | 19.2 |
| MobileNet-SSDLite | 300 × 300 | 1.30B | 5.10M | 22.2 | — | — |
| MobileNetv2-SSDLite | 300 × 300 | 0.80B | 4.30M | 22.1 | — | — |
| Pelee | 304 × 304 | 1.29B | 5.98M | 22.4 | 38.3 | 22.9 |
| Tiny-DSOD | 300 × 300 | 1.12B | 1.15M | 23.2 | 40.4 | 22.8 | where MobileNet-SSDLite and MobileNetv2 are disclosed in Sandler, M. et al., "Inverted residuals and linear bottlenecks: Mobile networks for classification, detection and segmentation", CVPR (2018). Tiny-DSOD achieves 23.2% mAP on the 'test-dev' set in the metric of AP@IOU[0.5: 0.95] where IOU stands for Intersection over Union. This outperforms the lightweight counterparts MobileNet-SSD (v1 & v2) and PeleeNet, and even outperforms the full-sized detector (YOLOv2) (see Redmon, J. et al., "Yolo9000: Better, faster, stronger", CVPR (2017)). In addition, Tiny-DSOD has a significantly smaller model compared to all of the listed methods in Table 5.

Overall, Tiny-DSOD realizes a better trade-off between resources (parameters, FLOPs, and memory) and accuracy. Experiments show that Tiny-DSOD outperforms state-of-the-art methods (Tiny YOLO, MobileNet-SSD v1 & v2, SqueezeDet, Pellee, and so forth, in each benchmark on all three metrics (accuracy, speed in term of FLOPs, and parameter-size).

In addition, any one or more of the operations explained with the methods of FIGS. 1 and 10A-10B, and neural networks of FIGS. 2 to 9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 11:
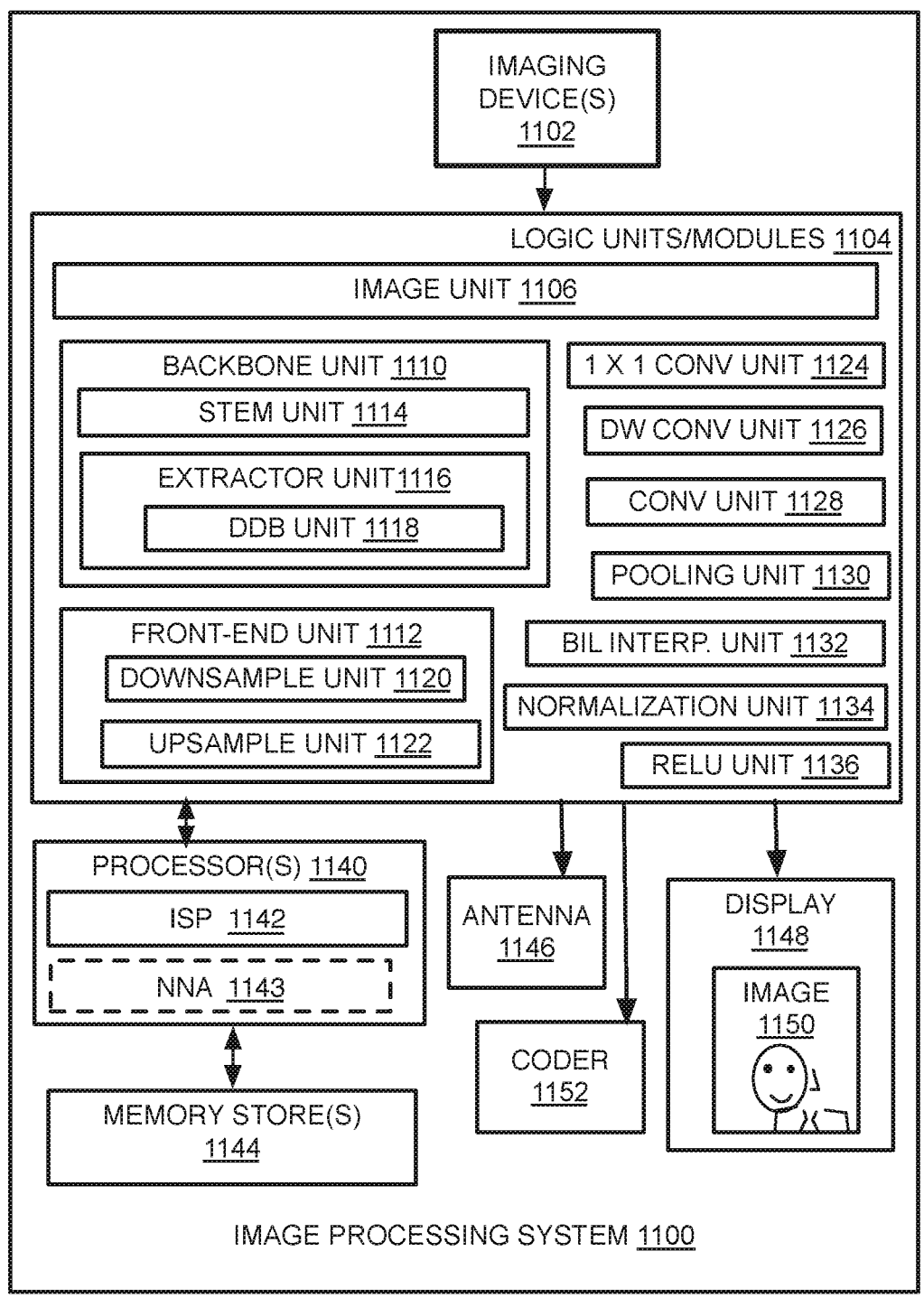
FIG. 11 is an illustrative diagram of an example system.

Referring to FIG. 11, an example image processing system 1100 is arranged in accordance with at least some implementations of the present disclosure. In various implementations, the example image processing system 1100 may have an imaging device 1102 to form or receive captured image data. This can be implemented in various ways. Thus, in one form, the image processing system 1100 may be one or more digital cameras or other image capture devices, and imaging device 1102, in this case, may be the camera hardware and camera sensor software, module, or component. In other examples, imaging processing system 1100 may have an imaging device 1102 that includes or may be one or more cameras, and logic modules 1104 may communicate remotely with, or otherwise may be communicatively coupled to, the imaging device 1102 for further processing of the image data.

Thus, image processing system 1100 may be a single camera alone or on a multi-camera device either of which may be a smartphone, tablet, laptop, computer, or other mobile device, or could be computer vision cameras and sensors, and/or VR, AR, or MR headsets, glasses or other headwear positioned over a person's eyes. The cameras may capture images in either visible or non-visible spectrums. Otherwise, image processing system 1100 may be the device with multiple cameras where the processing occurs at one of the cameras or at a separate processing location communicating with the cameras whether on-board or off of the device, and whether the processing is performed at a mobile device or not.

In any of these cases, such technology may include a camera such as a digital camera system, a dedicated camera device, or multi-purpose device such as an imaging phone or tablet. Thus, in one form, imaging device 1102 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1102 also may have a lens, an image sensor with a RGB Bayer color filter, an analog amplifier, an A/D converter, other components to convert incident light into a digital signal, the like, and/or combinations thereof, and/or other components when camera or sensor captures images that are not in the visible domain. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In these examples, in addition to a camera sensor, the same sensor or a separate sensor may be provided as well as light projector, such as an IR projector to provide a separate depth image that can be used for triangulation with the camera image. Otherwise, the imaging device may have any other known technology for providing depth maps by using multiple camera or imaging devices, or a single imaging device.

In the illustrated example and relevant here, the logic modules 1104 may include an image unit 1106 that performs pre-processing on the raw image data sufficient for object detection and semantic segmentation. This may include conversion of image data to whatever formats are needed such as generating a depth map or depth image. The logic modules also may have a back bone unit 1110 and a front end unit 1112. The backbone unit 1110 has a stem unit 1114 and an extractor unit 1116. The extractor unit 1116 has a DDB unit 1118 to operate the DDBs. The front-end unit 1112 has a downsampling unit and an upsampling unit that perform the relevant tasks related to upsampling or downsampling. These specific-purpose units perform or activate the specific tasks related to the title of the unit. Other general neural network units may be operated or controlled according to the instructions of the specific purpose units. Thus, such general neural network units may include a 1×1 convolutional unit 1124, a DW convolutional unit 1126, a convolutional unit 1128, a pooling unit 1130, a bilinear interpolation unit 1132, a normalization unit 1134, and a RELU unit 1136 to name a few examples. The tasks performed by each of these units are related to the title of the unit and is described in detail above.

The image processing system 1100 may have one or more processors 1140 which may include a dedicated image signal processor (ISP) 1142 such as the Intel Atom, or neural network accelerator (NNA), memory stores 1144, one or more displays 1148 to provide images 1150, a coder 1152, and antenna 1146. In one example implementation, the image processing system 1100 may have the display 1148, at least one processor 1140 communicatively coupled to the display, and memory stores 1144 communicatively coupled to the processor. The coder 1152 may be an encoder, decoder, or both. Otherwise, the processed image 1150 may be displayed on display 1148 or stored in memory stores 1144. As illustrated, any of these components may be capable of communication with one another and/or communication with portions of logic modules 1104 and/or imaging device 1102. Thus, processors 1140 may be communicatively coupled to both the image device 1102 and the logic modules 1104 for operating those components. By one approach, although image processing system 1100, as shown in FIG. 11, may include one particular set of blocks or actions associated with particular components or modules, these blocks or actions may be associated with different components or modules than the particular component or module illustrated here.

Figure 12:
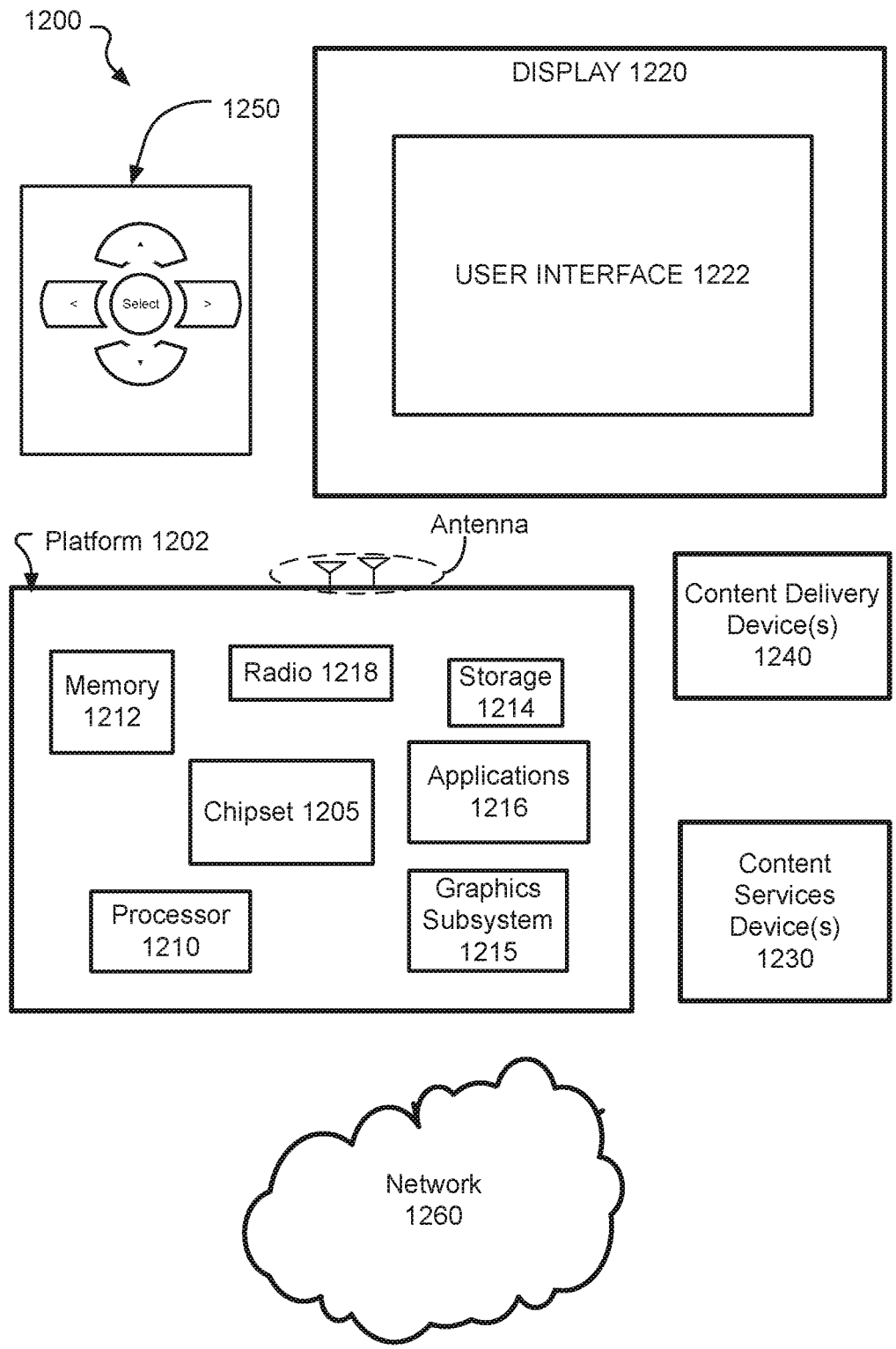
FIG. 12 is an illustrative diagram of another example system.

Referring to FIG. 12, an example system 1200 in accordance with the present disclosure operates one or more aspects of the image processing system described herein. It will be understood from the nature of the system components described below that such components may be associated with, or used to operate, certain part or parts of the image processing system 1200 described above, and therefore, used to operate the methods described herein. In various implementations, system 1200 may be a media system although system 1200 is not limited to this context. For example, system 1200 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, Display Port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
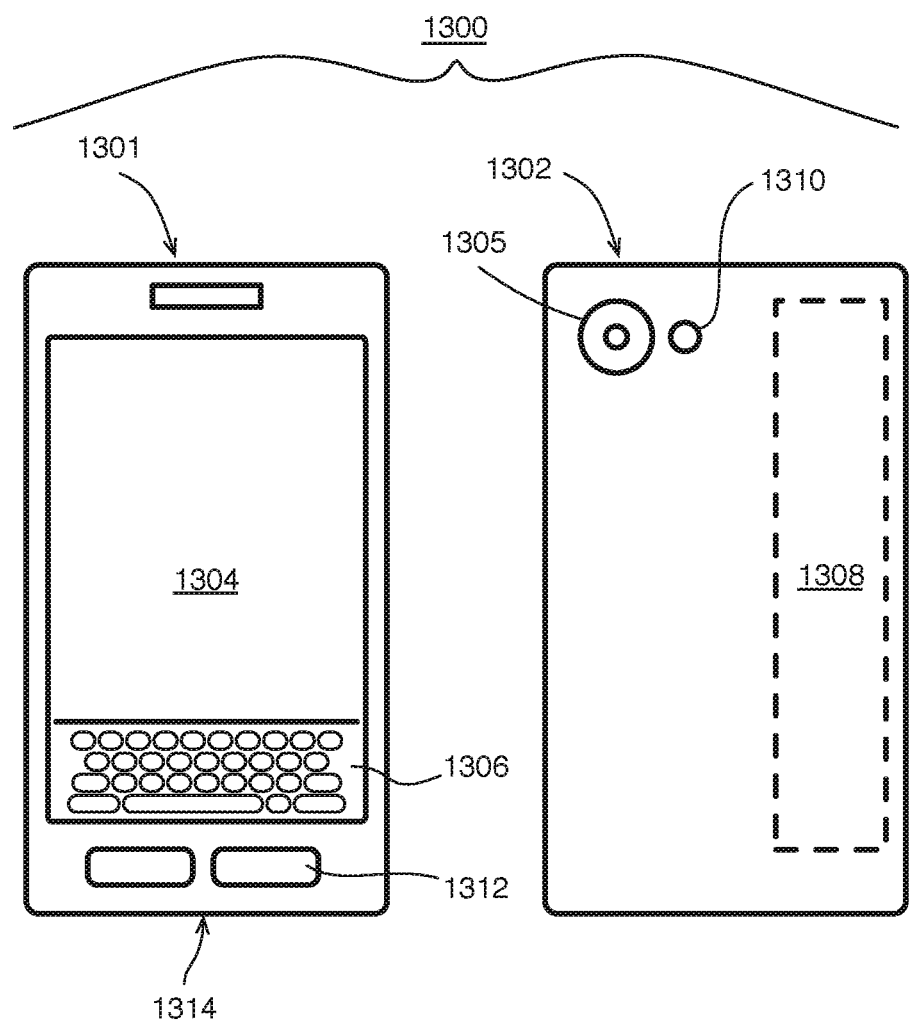
FIG. 13 illustrates another example device, all arranged in accordance with at least some implementations of the present disclosure.

Referring to FIG. 13, a small form factor device 1300 is one example of the varying physical styles or form factors in which systems 1100 or 1200 may be embodied. By this approach, device 1300 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone 1314, or may be digitized by a voice recognition device. As shown, device 1300 may include a camera 1305 (e.g., including at least one lens, aperture, and imaging sensor) and an illuminator 1310, such as those described herein, integrated into back 1302 (or elsewhere) of device 1300. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of object detection for image processing comprises obtaining image data of pixels of at least one image having content with one or more objects; and operating a neural network having at least one sequence of depth-wise dense blocks wherein each depth-wise dense block has at least one depth-wise convolutional layer, operating of an individual depth-wise dense block comprising: receiving input from a previous layer and having multiple input channels, and separately propagating, at the same depth-wise convolutional layer, channels of the multiple input channels, and comprising applying at least one separate filter to each propagating channel to form at least one separate feature map of each propagating channel that is separate from the feature maps of other channels: concatenating together resulting data of multiple depth-wise dense blocks positioned prior to a next depth-wise dense block in the same sequence and to form input data of either the next depth-wise dense block in the sequence or a next layer of the neural network, and classifying the one or more objects at least partly depending on the output of the at least one sequence of depth-wise dense blocks in the neural network.

Otherwise, the method may include that (1) wherein at least one of the depth-wise dense blocks comprises convolutional layers of, in order, one 1×1 convolutional layer, one of the depth-wise convolutional layers, and then another 1×1 convolutional layer, or (2) wherein at least one of the depth-wise dense blocks comprises convolutional layers of, in order, one 1×1 convolutional layer, and then one of the depth-wise convolutional layers, wherein at least one of the sequences has four of the depth-wise dense blocks and at least another of the sequences has six depth-wise dense blocks. The method also comprises separately forwarding the resulting data of each depth-wise dense block in one of the sequences to all subsequent depth-wise dense blocks in the same sequence, and either (a) wherein the resulting data is a set of the feature maps to be concatenated with the resulting data of other depth-wise dense blocks in the same sequence, or (b) wherein the resulting data is a combination of the feature maps by 1×1 convolution, and wherein the combination is concatenated with the resulting data of other depth-wise dense blocks in the same sequence. The method also comprises operating a transition layer directly after at least one of the depth-wise dense layer sequences and comprising at least a 1×1 point-wise layer, and wherein some of the transition layers being less than all of the transition layers having a pooling layer, wherein the transition layer is provided after each depth-wise dense block sequence.

The method also may comprise wherein operating the neural network comprises operating a stem portion before an extractor portion, wherein the at least one sequence is operated during the extractor portion; the operating comprising operating at least two depth-wise convolutional layers alternatingly with at least two non-depth-wise convolutional layers during the stem portion operation, wherein the depth-wise output of the at least one depth-wise convolutional layer has a number of channels determined by setting at least one hyper-parameter to control a size of the output data of the at least one depth-wise convolutional layer, wherein the depth-wise dense blocks are used in a backbone portion of the neural network to detect objects.

The method may further comprise operating a front end portion of the neural network to classify detected objects and comprising performing a feature pyramid network comprising: downsampling feature maps comprising concatenating data from a pooling stack and data from a separate depth-wise convolution layer stack initially using the same input data as the pooling layer, and after the downsampling, upsampling feature maps comprising performing, in order: bilinear interpolation of input data followed by a depth-wise convolution for separately forming intermediate output feature maps, and thereafter the interpolation, an element by element summation of the intermediate feature map with data of an upsampled feature map of the upsampling pyramid.

By yet another implementation, a computer-implemented system of object detection for image processing comprising at least one image capture device; at least one display; at least one memory; at least one processor communicatively coupled to the display and the memory and to operate by: obtaining image data of pixels of at least one image having content with one or more objects; and operating a neural network having at least one sequence of depth-wise dense blocks wherein each depth-wise dense block has at least one depth-wise convolutional layer, operating of an individual depth-wise dense block comprising: receiving input from a previous layer and having multiple input channels, and separately propagating, at the same depth-wise convolutional layer, channels of the multiple input channels, and comprising applying at least one separate filter to each propagating channel to form at least one separate feature map of each propagating channel that is separate from the feature maps of other channels; concatenating together resulting data of multiple depth-wise dense blocks positioned prior to a next depth-wise dense block in the same sequence and to form input data of either the next depth-wise dense block in the sequence or a next layer of the neural network; and classifying the one or more objects at least partly depending on the output of the at least one sequence of depth-wise dense blocks in the neural network.

By another example, the system provides that either (1) wherein each depth-wise dense block in at least one same sequence has three convolution layers forming a bottleneck arrangement with a first 1×1 bottleneck convolution layer having a number of output channels set according to a hyper-parameter bottleneck ratio, a second 3×3 depth-wise convolution layer having the same number of output channels as the first layer, and a third 1×1 convolution layer having the number of output channels set by a hyper-parameter growth rate that is a number of output channels of a layer; or (2) wherein each depth-wise dense block in at least one same sequence has two convolution layers forming a bottleneck arrangement with a first 1×1 bottleneck convolution layer having a number of output channels set according to a hyper-parameter growth rate that is a number of output channels of a layer, and a second 3×3 depth-wise convolution layer having the same number of output channels as the first layer. The processor(s) also may operate such that wherein a batch normalization operation and ReLU layer is provide after each convolutional layer in the neural network; and either (a) wherein the resulting data is a set of the feature maps to be concatenated with the resulting data of other depth-wise dense blocks in the same sequence; or (b) wherein the resulting data is a combination of the feature maps by 1×1 convolution, and wherein the combination is concatenated with the resulting data of other depth-wise dense blocks in the same sequence; wherein operating the neural network comprises operating a stem portion before an extractor portion, wherein the at least one sequence is operated during the extractor portion; the operating comprising operating at least two depth-wise convolutional layers alternatingly with at least two non-depth-wise convolutional layers during the stem portion operation.

By one approach, at least one non-transitory computer readable medium having stored thereon instructions that when executed cause a computing device to operate by: obtaining image data of pixels of at least one image having content with one or more objects; and operating a neural network having at least one sequence of depth-wise dense blocks wherein each depth-wise dense block has at least one depth-wise convolutional layer, wherein the operating of an individual depth-wise dense block comprising: receiving input from a previous layer and having multiple input channels, and separately propagating, at the same depth-wise convolutional layer, channels of the multiple input channels, and comprising applying a separate filter to each propagating channel to form at least one separate feature map of each propagating channel that is separate from the feature maps of other channels; concatenating together resulting data of multiple depth-wise dense blocks positioned prior to a next depth-wise dense block in the same sequence and to form input data of either the next depth-wise dense block in the sequence or a next layer of the neural network; and classifying the one or more objects at least partly depending on the output of the at least one sequence of depth-wise dense blocks in the neural network.

By another approach, the instructions cause the computing device to operate so that wherein the instructions cause the computing device to operate by separately forwarding the resulting data of each depth-wise dense block in one of the sequences to all subsequent depth-wise dense blocks in the same sequence; wherein the depth-wise dense blocks are used in a backbone portion of the neural network to detect objects, and the instructions cause the computing device to operate by operating a front end portion of the neural network to classify detected objects and comprising performing a feature pyramid network comprising: downsampling feature maps comprising downsampling concatenating data from both a pooling stack and a depth-wise stack, wherein the pooling stack and depth-wise stack initially use the same layer input data, wherein the pooling stack has a first 2×2 pooling layer and second a 1×1 convolutional layer and wherein the depth-wise stack first has a 1×1 convolutional layer and then a 3×3 depth-wise convolutional layer; and repeating the downsampling to form a series of increasingly smaller feature maps; wherein after the downsampling, the instructions cause the computing device to operate by upsampling feature maps and comprising performing, in order: bilinear interpolation of input data, a depth-wise convolution of the interpolated input data for separately forming intermediate output feature maps, an element by element summation of the data of one of the intermediate output feature maps with data of a feature map of the upsampling pyramid with a size corresponding to a size of the intermediate output feature map; and repeating the upsampling to form a series of increasingly larger feature maps.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of object detection for image processing, comprising:
  obtaining image data of pixels of at least one image;
  operating a backbone of a neural network to identify objects in the at least one image, wherein the neural network having at least one sequence of depth-wise dense blocks, wherein each depth-wise dense block has at least one depth-wise convolutional layer separately propagating channels comprising applying at least one separate filter to each propagating channel to form at least one separate feature map of each propagating channel that is separate from the feature maps of other channels;
  concatenating together resulting data of multiple depth-wise dense blocks; and
  operating a front end feature pyramid network of the neural network to classify the objects and comprising operating a downsampling pyramid that generates downsampled feature maps at a sequence of multiple individual downsampling layers, and an upsampling pyramid to generate intermediate feature maps at a sequence of multiple individual upsampling layers, wherein the intermediate feature maps are individually combined with an individual downsampled feature map to generate combined map data to provide as input to a next upsampling layer.

2. The method of claim 1 wherein at least one of the depth-wise dense blocks comprises convolutional layers of, in order, one 1×1 convolutional layer, one of the depth-wise convolutional layers, and then another 1×1 convolutional layer.

3. The method of claim 1 wherein at least one of the depth-wise dense blocks comprises convolutional layers of, in order, one 1×1 convolutional layer, and then one of the depth-wise convolutional layers.

4. The method of claim 1 wherein at least one of the sequences has four of the depth-wise dense blocks and at least another of the sequences has six depth-wise dense blocks.

5. The method of claim 1 comprising separately forwarding the resulting data of each depth-wise dense block in one of the sequences to all subsequent depth-wise dense blocks in the same sequence.

6. The method of claim 1 wherein the resulting data is a set of the feature maps to be concatenated with the resulting data of other depth-wise dense blocks in the same sequence.

7. The method of claim 1 wherein the resulting data is a combination of the feature maps by 1×1 convolution, and wherein the combination is concatenated with the resulting data of other depth-wise dense blocks in the same sequence.

8. The method of claim 1 comprising operating a transition layer directly after at least one of the depth-wise dense layer sequences and comprising at least a 1×1 point-wise layer, and wherein some of the transition layers being less than all of the transition layers having a pooling layer.

9. The method of claim 8 wherein the transition layer is provided after each depth-wise dense block sequence.

10. The method of claim 1 wherein operating the neural network comprises operating a stem portion before an extractor portion, wherein the at least one sequence is operated during the extractor portion; the operating comprising operating at least two depth-wise convolutional layers alternatingly with at least two non-depth-wise convolutional layers during the stem portion operation.

11. The method of claim 1 wherein the depth-wise output of the at least one depth-wise convolutional layer has a number of channels determined by setting at least one hyper-parameter to control a size of the output data of the at least one depth-wise convolutional layer.

12. The method of claim 1 comprising:
downsampling feature maps comprising concatenating data from a pooling stack and data from a separate depth-wise convolution layer stack initially using the same input data as the pooling layer, and
after the downsampling, upsampling feature maps comprising performing, in order:
bilinear interpolation of input data followed by a depth-wise convolution for separately forming the intermediate feature maps, and
thereafter the interpolation, an element by element summation of the intermediate feature map with data of a downsampled feature map of the downsampling pyramid to generate combined data to input to the next upsampling layer.

13. A computer-implemented system of object detection for image processing, comprising:
at least one image capture device;
at least one display;
at least one memory;
at least one processor communicatively coupled to the display and the memory and to operate by:
obtaining image data of pixels of at least one image;
operating a backbone of a neural network to identify objects in the at least one image, wherein the neural network having at least one sequence of depth-wise dense blocks, wherein each depth-wise dense block has at least one depth-wise convolutional layer separately propagating channels comprising applying at least one separate filter to each propagating channel to form at least one separate feature map of each propagating channel that is separate from the feature maps of other channels;
concatenating together resulting data of multiple depth-wise dense blocks; and
operating a front end feature pyramid network of the neural network to classify the objects and comprising operating a downsampling pyramid that generates downsampled feature maps at a sequence of multiple individual downsampling layers and an upsampling pyramid to generate intermediate feature maps at a sequence of multiple individual upsampling layers, wherein the intermediate feature maps are individually combined with an individual downsampled feature map to generate combined map data to provide as input to a next upsampling layer.

14. The system of claim 13 wherein each depth-wise dense block in at least one same sequence has three convolution layers forming a bottleneck arrangement with a first layer with a 1×1 bottleneck convolution and having a number of output channels set according to a hyper-parameter bottleneck ratio, a second 3×3 depth-wise convolution layer having the same number of output channels as the first layer, and a third 1×1 convolution layer having the number of output channels set by a hyper-parameter growth rate that is a number of output channels of a layer.

15. The system of claim 13 wherein each depth-wise dense block in at least one same sequence has two convolution layers forming a bottleneck arrangement with a first layer with a 1×1 bottleneck convolution and having a number of output channels set according to a hyper-parameter growth rate that is a number of output channels of a layer, and a second 3×3 depth-wise convolution layer having the same number of output channels as the first layer.

16. The system of claim 13 wherein a batch normalization operation and ReLU layer is provide after each convolutional layer in the backbone of the neural network.

17. The system of claim 13 wherein the resulting data is a set of the feature maps to be concatenated with the resulting data of other depth-wise dense blocks in the same sequence.

18. The system of claim 13 wherein the resulting data is a combination of the feature maps by 1×1 convolution, and wherein the combination is concatenated with the resulting data of other depth-wise dense blocks in the same sequence.

19. The system of claim 13 wherein operating the neural network comprises operating a stem portion before an extractor portion, wherein the at least one sequence is operated during the extractor portion; the operating comprising operating at least two depth-wise convolutional layers alternatingly with at least two non-depth-wise convolutional layers during the stem portion operation.

20. At least one non-transitory computer-readable medium having stored thereon instructions that when executed cause a computing device to operate by:
obtaining image data of pixels of at least one image;
operating a backbone of a neural network to identify objects in the at least one image, wherein the neural network having at least one sequence of depth-wise dense blocks, wherein each depth-wise dense block has at least one depth-wise convolutional layer separately propagating channels comprising applying at least one separate filter to each propagating channel to form at least one separate feature map of each propagating channel that is separate from the feature maps of other channels;

concatenating together resulting data of multiple depth-wise dense blocks; and operating a front end feature pyramid network of the neural network to classify the objects and comprising operating a downsampling pyramid that generates downsampled feature maps at a sequence of multiple individual downsampling lavers, and an upsampling pyramid to generate intermediate feature maps at a sequence of multiple individual upsampling layers, wherein the intermediate feature maps are individually combined with an individual downsampled feature map to generate combined map data to provide as input to a next upsampling layer.

21. The medium of claim 20 wherein the instructions cause the computing device to operate by separately forwarding the resulting data of each depth-wise dense block in one of the sequences to all subsequent depth-wise dense blocks in the same sequence.

22. The medium of claim 20 wherein the instructions cause the computing device to operate by:

downsampling feature maps comprising downsampling concatenating data from both a pooling stack and a depth-wise stack, wherein the pooling stack and depth-wise stack initially use the same layer input data, wherein the pooling stack has a first 2×2 pooling layer and second a 1×1 convolutional layer, wherein the depth-wise stack first has a 1×1 convolutional layer and then a 3×3 depth-wise convolutional layer; and repeating the downsampling to form a series of increasingly smaller feature maps.

23. The medium of claim 22 wherein after the downsampling, the instructions cause the computing device to operate by upsampling feature maps and comprising performing, in order:

bilinear interpolation of input data, a depth-wise convolution of the interpolated input data for separately forming the intermediate feature maps, an element by element summation of the data of one of the intermediate feature maps with data of a feature map of the downsampling pyramid with a size corresponding to a size of the intermediate feature map; and repeating the upsampling to form a series of increasingly larger feature maps.

24. The medium of claim 20 wherein the resulting data is a set of the feature maps to be concatenated with the resulting data of other depth-wise dense blocks in the same sequence.

25. A computer-implemented method of object detection for image processing, comprising:

obtaining image data of pixels of at least one image;

operating a backbone of a neural network to identify objects in the at least one image, wherein the neural network having at least one sequence of depth-wise dense blocks, wherein each depth-wise dense block has at least one depth-wise convolutional layer separately propagating channels each with a different filter; and operating a front end feature pyramid network of the neural network to classify the objects and comprising operating a downsampling pyramid that generates downsampled feature maps at a sequence of multiple individual downsampling layers, and an upsampling pyramid to generate intermediate feature maps at a sequence of multiple individual upsampling layers, wherein the intermediate feature maps are individually combined with an individual downsampled feature map to generate combined map data to provide as input to a next upsampling layer.

* * * * *